(12) United States Patent
Saito et al.

(10) Patent No.: US 10,719,242 B2
(45) Date of Patent: Jul. 21, 2020

(54) REPORT PREPARATION PROGRAM AND REPORT PREPARATION METHOD

(71) Applicant: FUJITSU LIMITED, Kawasaki-shi, Kanagawa (JP)

(72) Inventors: Yuji Saito, Yokohama (JP); Tetsuya Uchiumi, Kawasaki (JP); Yukihiro Watanabe, Kawasaki (JP); Reiko Kondo, Yamato (JP); Kazuhiro Suzuki, Kawasaki (JP); Masahiro Asaoka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/291,035

(22) Filed: Mar. 4, 2019

(65) Prior Publication Data

US 2019/0278489 A1 Sep. 12, 2019

(30) Foreign Application Priority Data

Mar. 9, 2018 (JP) .................. 2018-043580

(51) Int. Cl.
*G06F 3/06* (2006.01)
*G06F 11/30* (2006.01)
*G06N 20/00* (2019.01)

(52) U.S. Cl.
CPC .......... *G06F 3/0613* (2013.01); *G06F 3/0629* (2013.01); *G06F 3/0674* (2013.01);
(Continued)

(58) Field of Classification Search
CPC .... G06F 3/0629; G06F 3/0674; G06F 3/0613; G06F 11/3082; G06F 11/3034; G06F 17/248; G06F 17/278; G06N 5/04
See application file for complete search history.

(56) References Cited

U.S. PATENT DOCUMENTS

| 2016/0124933 | A1 | 5/2016 | Takeuchi et al. |
| 2017/0234773 | A1 | 8/2017 | Demarco et al. |
| 2018/0245987 | A1* | 8/2018 | Mizoguchi ......... G05B 23/0224 |

FOREIGN PATENT DOCUMENTS

| JP | 2016-091078 | 5/2016 |
| JP | 2017-146299 | 8/2017 |

OTHER PUBLICATIONS

F. B. Garcia and J. V. Benlloch-Dualde, "Learning analytics sources: Beyond learning platforms," 2016 International Symposium on Computers in Education (SIIE), Salamanca, 2016, pp. 1-6. (Year: 2016).*

* cited by examiner

*Primary Examiner* — Khoa D Doan
(74) *Attorney, Agent, or Firm* — Fujitsu Patent Center

(57) ABSTRACT

A computer-readable recording medium storing therein a report preparation program that causes at least one of storages and a computer coupled to the at least one of storages to execute a process for calculating an individual-feature quantity with respect to an input output per second (IOPS) of the at least one of storages for each piece of time-series data included in a time-series data group with respect to the IOPS; statistically processing the calculated individual-feature quantity of the time-series data group; calculating an entire-feature quantity based on the statistically processing; referring to a learning model generated based on at least one of learning time-series data groups and contents of a report for the at least one of learning time-series data groups, the learning model representing a relationship between an entire-feature quantity and contents of the report; and outputting information on contents of the report corresponding the calculated entire-feature quantity.

16 Claims, 35 Drawing Sheets

ENTIRE-FEATURE QUANTITY

| DATA GROUP ID | var MAXIMUM VALUE | var MINIMUM VALUE | spike MAXIMUM VALUE | spike MINIMUM VALUE | ... |
|---|---|---|---|---|---|
| 1 | 4.1 | 1.0 | 5.1 | 1.1 | ... |
| 2 | 1.1 | 0.4 | 3.5 | 0.1 | ... |
| ... | ... | ... | ... | ... | ... |

(52) U.S. Cl.
CPC ...... *G06F 11/3034* (2013.01); *G06F 11/3082* (2013.01); *G06N 20/00* (2019.01)

| DATA GROUP ID | DATA ID | TIME O'CLOCK | CONTENTS (STORAGE IO) |
|---|---|---|---|
| 1 | 1 | 20170901 00:00:07 | 100 IOPS |
| 1 | 1 | 20170901 00:01:07 | 130 IOPS |
| 1 | 1 | ⋮ | ⋮ |
| 1 | 2 | 20170901 00:00:07 | 100 IOPS |
| 1 | 2 | ⋮ | ⋮ |
| 1 | ⋮ | ⋮ | ⋮ |
| 2 | 1 | 20170901 00:00:07 | 100 IOPS |
| 2 | ⋮ | ⋮ | ⋮ |
| ⋮ | | | |

FIG. 7

APPEARANCE FLAG FOR EACH TYPE OF COMMENTS — 700

| DATA GROUP ID | OVERALL MAXIMUM VALUE/ AVERAGE VALUE | MOMENTARY HIGH LOAD | CONSECUTIVE HIGH LOAD | SMALL VARIATION | SMALL LOAD | ... |
|---|---|---|---|---|---|---|
| 1 | 1 | 1 | 0 | 0 | 1 | ... |
| 2 | 0 | 0 | 1 | 1 | 1 | ... |
| ... | ... | ... | ... | ... | ... | ... |

| DATA GROUP ID | ATTENTION LEVEL FOR EACH TYPE OF COMMENTS | | | | |
|---|---|---|---|---|---|
| | OVERALL MAXIMUM VALUE/ AVERAGE VALUE | MOMENTARY HIGH LOAD | CONSECUTIVE HIGH LOAD | SMALL VARIATION | SMALL LOAD |
| 1001 | 0.8 | 0.7 | 0.2 | 0.1 | 1.0 |
| ⋮ | | | | | ⋮ |

| CLASSIFICATION | COMMENT |
|---|---|
| OVERALL MAXIMUM VALUE/ AVERAGE VALUE | Maximum value is <value 1>, and average value is <value 2>. |
| MOMENTARY HIGH LOAD | <Data name> has a momentary load at <time o'clock>. |
| CONSECUTIVE HIGH LOAD | <Data name> has high load from <time o'clock 1> to <time o'clock 2>. |
| SMALL LOAD | <Data name> has a load of <value> or less, which is very low. |
| LARGE VARIATION | <Data name> is in a state where variation is large. |
| SMALL VARIATION | <Data name> is in a state where variation is small. |

| NODE ID | PARENT NODE ID | PARENT NODE True/False | FEATURE QUANTITY | THRESHOLD | ATTENTION LEVEL WHEN True | ATTENTION LEVEL WHEN False |
|---|---|---|---|---|---|---|
| 1 | - | - | var MINIMUM VALUE | 0.5 | - | 0.1 |
| 2 | 1 | True | spike MAXIMUM VALUE | 0.4 | 0.2 | 0.8 |

FIG. 16

EXISTING REPORT 1 (DATA GROUP ID: 1) ~1601
■ Maximum value is 1500 IOPS, and average value is 800 IOPS.
■ Vol 0 has a momentary load at 10 o'clock.
■ Vol 0 has a high load from 1 o'clock to 3 o'clock.
■ Vol 1 has a high load from 5 o'clock to 7 o'clock.

EXISTING REPORT 2 (DATA GROUP ID: 2) ~1602
■ Maximum value is 1000 IOPS, and average value is 400 IOPS.
■ Vol 0 is in a state where variation is small.
■ Vol 0 has a high load from 1 o'clock to 3 o'clock.
■ Vol 1 has a load of 100 IOPS or less, which is very low.
■ Vol 1 is in a state where variation is small.

EXISTING REPORT 3 (DATA GROUP ID: 3) ~1603
■ Maximum value is 3000 IOPS, and average value is 1200 IOPS.
■ Vol 0 is in a state where variation is large.
■ Vol 0 has a momentary load at 17 o'clock.
■ Vol 1 has a high load from 6 o'clock to 12 o'clock.
■ Vol 2 is in a state where variation is large.

⇒ CLASSIFICATION 900

| CLASSIFICATION | COMMENT |
|---|---|
| OVERALL MAXIMUM VALUE/ AVERAGE VALUE | Maximum value is <value 1>, and average value is <value 2>. |
| MOMENTARY HIGH LOAD | <Data name> has a momentary load at <time o'clock>. |
| CONSECUTIVE HIGH LOAD | <Data name> has high load from <time o'clock 1> to <time o'clock 2>. |
| SMALL LOAD | <Data name> has a load of <value> or less, which is very low. |
| LARGE VARIATION | <Data name> is in a state where variation is large. |
| SMALL VARIATION | <Data name> is in a state where variation is small. |

FIG. 17

PRESENCE OR ABSENCE OF COMMENT APPEARANCE (WITHOUT COMMENT: 0, WITH COMMENT: 1)

700

| DATA GROUP ID | OVERALL MAXIMUM VALUE/ AVERAGE VALUE | MOMENTARY HIGH LOAD | CONSECUTIVE HIGH LOAD | SMALL LOAD | SMALL VARIATION | LARGE VARIATION |
|---|---|---|---|---|---|---|
| 1 | 1 | 1 | 1 | 0 | 0 | 0 |
| 2 | 1 | 0 | 1 | 1 | 1 | 0 |
| 3 | 1 | 1 | 1 | 0 | 0 | 1 |
| 4 | ... | ... | ... | ... | ... | ... |

INDIVIDUAL-FEATURE QUANTITY

| DATA GROUP ID | DATA ID | var | spike |
|---|---|---|---|
| 1 | 1 | 0.8 | 1.0 |
| 1 | 2 | 0.4 | 0.3 |
| 1 | 3 | 0.2 | 0.1 |
| 2 | 1 | 0.1 | 0.2 |
| 2 | 2 | 0.1 | 0.1 |
| 3 | 1 | 0.9 | 0.8 |
| 3 | 2 | 0.7 | 0.4 |
| 3 | 3 | 0.8 | 0.2 |
| 4 | ... | ... | ... |

| ID | CALCULATION METHOD OF INDIVIDUAL-FEATURE QUANTITY |
|---|---|
| var | MAXIMUM VALUE – MINIMUM VALUE |
| spike | (80% PERCENTILE VALUE – MEDIAN VALUE) / (MAXIMUM VALUE – MEDIAN VALUE) |
| high_num | MAXIMUM VALUE OF FREQUENCY IN WHICH DATA VALUE IS LARGER THAN AVERAGE VALUE CONSECUTIVELY |
| high_val_sum | MAXIMUM VALUE OF Σ(DATA VALUE – AVERAGE VALUE) IN DATA IN WHICH DATA VALUE IS LARGER THAN AVERAGE VALUE CONSECUTIVELY |
| ave_ratio | AVERAGE VALUE IN TIME-SERIES DATA / AVERAGE VALUE IN TIME-SERIES DATA GROUP |

FIG. 23

INDIVIDUAL-FEATURE QUANTITY

500

| DATA GROUP ID | DATA ID | var | spike |
|---|---|---|---|
| 1 | 1 | 0.8 | 1.0 |
| 1 | 2 | 0.4 | 0.3 |
| 1 | 3 | 0.2 | 0.1 |
| 2 | 1 | 0.1 | 0.2 |
| 2 | 2 | 0.1 | 0.1 |
| 3 | 1 | 0.9 | 0.8 |
| 3 | 2 | 0.7 | 0.4 |
| 3 | 3 | 0.8 | 0.2 |
| 4 | ... | ... | ... |

501, 502, 503

ENTIRE-FEATURE QUANTITY

600

| DATA GROUP ID | var MAXIMUM VALUE | var MINIMUM VALUE | spike MAXIMUM VALUE | spike MINIMUM VALUE |
|---|---|---|---|---|
| 1 | 0.8 | 0.2 | 1.0 | 0.1 |
| 2 | 0.1 | 0.1 | 0.2 | 0.1 |
| 3 | 0.9 | 0.7 | 0.8 | 0.2 |
| 4 | ... | ... | ... | ... |

| DATA GROUP ID | var (VARIATION LEVEL) | spike (MOMENTARY HIGH LOAD PRESENCE LEVEL) | SMALL VARIATION COMMENT |
|---|---|---|---|
| 1 | DATA WITH SMALL FEATURE QUANTITY IS PRESENT (MINIMUM 0.2) | DATA WITH LARGE FEATURE QUANTITY IS PRESENT (MAXIMUM 1.0) | PRESENT |
| 2 | DATA WITH SMALL FEATURE QUANTITY IS PRESENT (MINIMUM 0.1) | NO DATA WITH LARGE FEATURE QUANTITY IS PRESENT (MAXIMUM 0.2) | NOT PRESENT |
| 3 | NO DATA WITH SMALL FEATURE QUANTITY IS PRESENT (MINIMUM 0.7) | DATA WITH LARGE FEATURE QUANTITY IS PRESENT (MAXIMUM 0.8) | PRESENT |

FIG. 28

Individual-feature quantity 500:

| DATA GROUP ID | DATA ID | var | spike |
|---|---|---|---|
| 1001 | 1 | 0.7 | 0.9 |
| 1001 | 2 | 0.3 | 0.3 |
| 1001 | 3 | 0.2 | 0.2 |
| 1001 | 4 | 0.4 | 0.3 |

Entire-feature quantity 600:

| DATA GROUP ID | var MAXIMUM VALUE | var MINIMUM VALUE | spike MAXIMUM VALUE | spike MINIMUM VALUE |
|---|---|---|---|---|
| 1001 | 0.7 | 0.2 | 0.9 | 0.2 |

FIG. 31

| COMMENT CLASSIFICATION | COMMENT |
|---|---|
| OVERALL MAXIMUM VALUE/ AVERAGE VALUE | Maximum value is <value 1>, and average value is <value 2>. |

| COMMENT |
|---|
| Maximum value is 120, and average value is 50. |

REPORT PREPARATION PROGRAM AND REPORT PREPARATION METHOD

CROSS-REFERENCE TO RELATED APPLICATION

This application is based upon and claims the benefit of priority of the prior Japanese Patent Application No. 2018-43580, filed on Mar. 9, 2018, the entire contents of which are incorporated herein by reference.

FIELD

The embodiments discussed herein are related a report preparation program and a report preparation method.

BACKGROUND

Generally, it may be desired to prepare a report for a time-series data group. For example, it is desirable to prepare a report in which performance logs indicating time changes such as a read input output per second (IOPS) and a write IOPS in infrastructure equipment is collected and what feature the performance logs represents is described.

As the related art, a method includes, for example, specifying a target keyword representing target data, selecting a target template to be used for expressing the target data based on the category of the target keyword, and generating a target text representing the target data. For example, provided is a technique of inputting motion data corresponding to a new test into a performance model peculiar to the engine type, electronically analyzing the output of the performance model, and electronically generating at least one summary report on an engine health status based on the analyzed output.

Examples of the related art include Japanese Laid-open Patent Publication No. 2016-91078 and Japanese Laid-open Patent Publication No. 2017-146299.

SUMMARY

According to an aspect of the embodiments, a computer-readable recording medium storing therein a report preparation program that causes at least one of storages and a computer coupled to the at least one of storages to execute a process, the process includes calculating an individual-feature quantity with respect to an input output per second (IOPS) of the at least one of storages for each piece of time-series data included in a time-series data group with respect to the IOPS; statistically processing the calculated individual-feature quantity to calculate an entire-feature quantity of the accepted time-series data group; and referring to a learning model generated based on at least one of time-series data groups and contents of a report for the at least one of time-series data groups, the learning model representing a relationship between an entire-feature quantity and contents of a report and outputting information on contents of a report corresponding a calculated entire-feature quantity.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is an explanatory diagram illustrating an example of storage contents of an appearance flag table;

FIG. 9 is an explanatory diagram illustrating an example of storage contents of a comment classification table;

FIG. 10 is an explanatory diagram illustrating an example of storage contents of a learning model table;

FIG. 16 is an explanatory diagram (part 1) illustrating an example of classifying comments;

FIG. 17 is an explanatory diagram (part 2) illustrating an example of classifying comments;

FIG. 19 is an explanatory diagram illustrating an example of a method of calculating individual-feature quantity;

FIG. 23 is an explanatory diagram illustrating an example of calculating an entire-feature quantity of a learning time-series data group;

FIG. 24 is an explanatory diagram representing features of a learning time-series data group;

FIG. 28 is an explanatory diagram illustrating an example of calculating an entire-feature quantity of a target time-series data group;

FIG. 31 is an explanatory diagram illustrating an example of selecting a type of comment described in a report;

FIG. 32 is an explanatory diagram illustrating an example of generating a comment described in a report;

DESCRIPTION OF EMBODIMENTS

In the background art, it is difficult to prepare a report representing the entire feature of the time-series data group. For example, a report in which time-series data having a relatively high importance level and time-series data having a relatively low importance level in the time-series data group are equally handled and a comment is prepared and added, thereby resulting in the report in which it is difficult to understand which part represents the entire feature of the time-series data group. Hereinafter, the embodiment of a report preparation program and a report preparation method will be described in detail with reference to the drawings.

An Embodiment of Report Preparation Method

Figure 1:
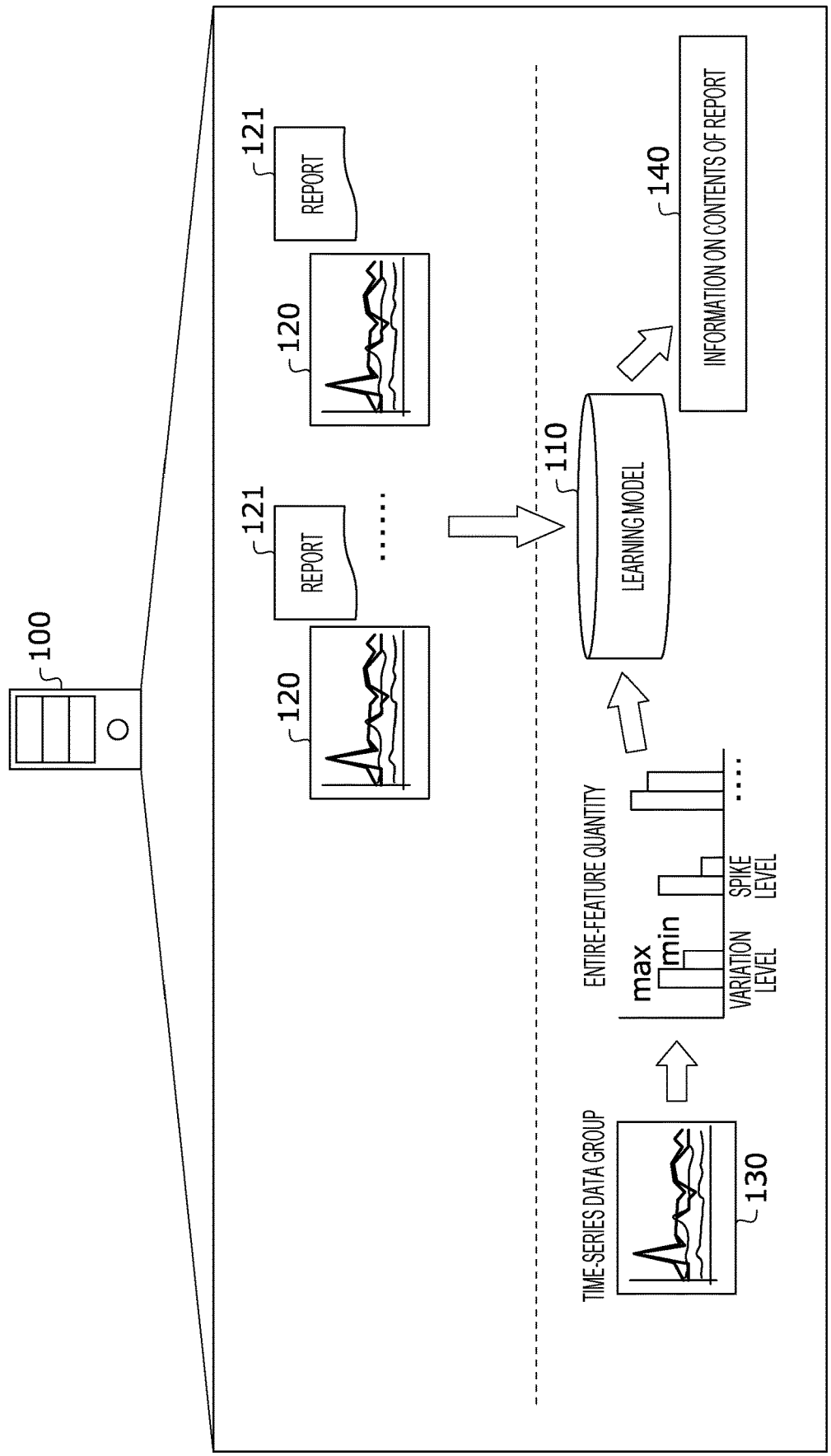
FIG. 1 is an explanatory diagram illustrating an example of a report preparation method according to an embodiment.

FIG. 1 is an explanatory diagram illustrating an example of a report preparation method according to the embodiment. An information processing device 100 is a computer that accepts a time-series data group. The time-series data group includes, for example, plural pieces of time-series data having an identical attribute. The attribute is, for example, a time zone in which each piece of data included in the time-series data is acquired or measured.

A service of preparing a report on the time-series data group may be made. For example, a service may be made in which a report is prepared on a time-series data group including time-series data representing time change such as a read IOPS and a write IOPS in infrastructure equipment, thereby making it possible to grasp operational problems with the infrastructure equipment.

On the other hand, techniques may be offered in which a comment for each piece of time-series data included in the time-series data group is prepared and a report describing the comment for each piece of time-series data is prepared. For example, a technique may be offered in which a feature quantity is calculated for each piece of time-series data and a comment corresponding to the feature quantity calculated for each piece of time-series data is prepared.

However, when preparing a report on the time-series data group, it may be preferable to prepare a report representing the entire feature of the time-series data group. For example, it may be preferable to prepare a report describing comments in consideration of a relationship between time-series data, an importance level of time-series data, and so forth. For example, it may be preferable to describe a comment in which one of the time-series data has a larger data variation than the other time-series data. For example, it may be preferable to describe a comment on time-series data with momentary data variation without describing a comment on time-series data with relatively few features.

In this case, in the above technique, a report representing a feature for each piece of time-series data included in the time-series data group is prepared, and the report does not take into consideration the relationship between the time-series data and the importance level of the time-series data. For example, a report in which time-series data determined to have a relatively high importance level and time-series data determined to have a relatively low importance level are equally handled and a comment is prepared and added, thereby resulting in the report in which it is difficult to understand which part represents the entire feature of the time-series data group. As a result, it is difficult to grasp which time-series data has a relatively high importance level and which time-series data is preferable to check. It is difficult to grasp the relationship between the time-series data.

Therefore, in the present embodiment, a report preparation method will be described in which it is possible to support the preparation of the report by statistically processing the individual-feature quantity for each piece of time-series data to calculate the entire-feature quantity of the time-series data group and outputting information on the report corresponding to the entire-feature quantity.

In FIG. 1, the information processing device 100 stores a learning model 110 representing the relationship between the entire-feature quantity and the contents of the report. The entire-feature quantity is a feature quantity calculated for the time-series data group. The learning model 110 is generated based on, for example, at least one of time-series data groups 120 and the contents of a report 121 for the at least one of time-series data groups 120. The learning model 110 includes a tree structure model or a mathematical expression model. The time-series data group 120 is for learning.

The information processing device 100 calculates the individual-feature quantity for each piece of time-series data included in a time-series data group 130. The time-series data group 130 is a target for which the preparation of the report is supported. The information processing device 100 statistically processes the calculated individual-feature quantity and calculates the entire-feature quantity of the accepted time-series data group 130. The entire-feature quantity is, for example, a statistical value of the individual-feature quantity. The statistical values include, for example, a maximum value, a minimum value, an average value, a mode value, and a median value.

The information processing device 100 refers to the learning model 110 and outputs information 140 on the contents of the report corresponding to the calculated entire-feature quantity. The information 140 on the contents of the report is, for example, a preparation index of a comment described in the report. The information on the contents of the report may be, for example, the contents of the report itself.

From this, the information processing device 100 may make it easier to prepare a report representing the entire feature of the time-series data group 130. Therefore, the information processing device 100 may easily grasp, for example, which part represents the entire feature of the time-series data group 130. For example, the information processing device 100 may easily grasp which time-series data has a relatively high importance level, and which time-series data is preferable to check, thereby easily grasping the relationship between the time-series data. The information processing device 100 may reduce the work burden of preparing the report representing the entire feature of the time-series data group 130.

An Example of Report Preparation System 200

Next, with reference to FIG. 2, an example of a report preparation system 200 to which the information processing device 100 illustrated in FIG. 1 is applied will be described.

Figure 2:
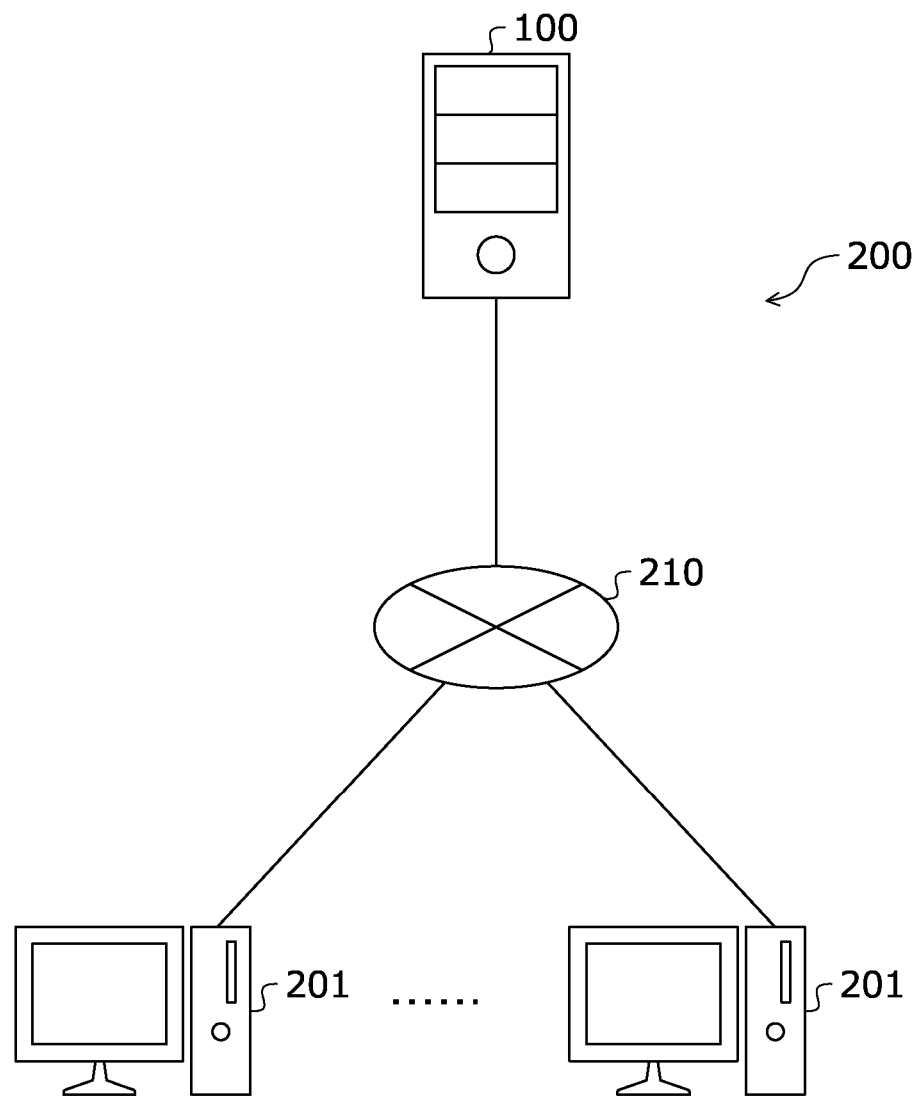
FIG. 2 is an explanatory diagram illustrating an example of a report preparation system.

FIG. 2 is an explanatory diagram illustrating an example of the report preparation system 200. In FIG. 2, the report preparation system 200 includes an information processing device 100 and a client device 201.

In the report preparation system 200, the information processing device 100 and the client device 201 are connected via a wired or a wireless network 210. The network 210 is, for example, a local area network (LAN), a wide area network (WAN), the Internet, or the like.

The information processing device 100 stores a learning model representing the relationship between the entire-feature quantity and the contents of the report. For example, the information processing device 100 accepts a plurality of combinations of learning time-series data groups and reports, generates and stores a learning model based on the combinations of the accepted learning time-series data groups and the accepted reports. The information processing device 100 accepts, for example, a combination of learning time-series data groups and reports based on an operation input by a user.

The information processing device 100 accepts the target time-series data group. For example, the information processing device 100 receives the target time-series data group from the client device 201. The information processing device 100 calculates the individual-feature quantity for each piece of time-series data included in the target time-series data group, statistically processes the calculated individual-feature quantity, and calculates the entire-feature quantity of the target time-series data group.

The information processing device 100 refers to the learning model and outputs information on the contents of the report corresponding to the calculated entire-feature quantity. For example, the information processing device 100 transmits information on the contents of the report to the client device 201. The information processing device 100 is, for example, a server, a personal computer (PC), or the like.

The client device 201 is a computer that acquires a time-series data group. The client device 201 acquires the time-series data group, for example, based on an operation input by a user. The client device 201 transmits the acquired time-series data group to the information processing device 100. The client device 201 receives and outputs information on the report corresponding to the time-series data group from the information processing device 100. The client device 201 is, for example, a server, a PC, a tablet terminal, a smartphone, or the like.

The case where the information processing device 100 is different from the client device 201 has been described, but the present embodiment is not limited to this case. For example, the information processing device 100 may be integrated with the client device 201. In this case, for example, the information processing device 100 accepts the target time-series data group based on an operation input by a user.

The case where the information processing device 100 generates a learning model and outputs information on the contents of the report with reference to the learning model has been described, but the present embodiment is not limited to this case. For example, the information processing device 100 that generates a learning model and the information processing device 100 that outputs information on the contents of the report with reference to the learning model may be independent, and may cooperate with each other.

Hardware Configuration Example of Information Processing Device 100

Next, a hardware configuration example of the information processing device 100 will be described with reference to FIG. 3.

Figure 3:
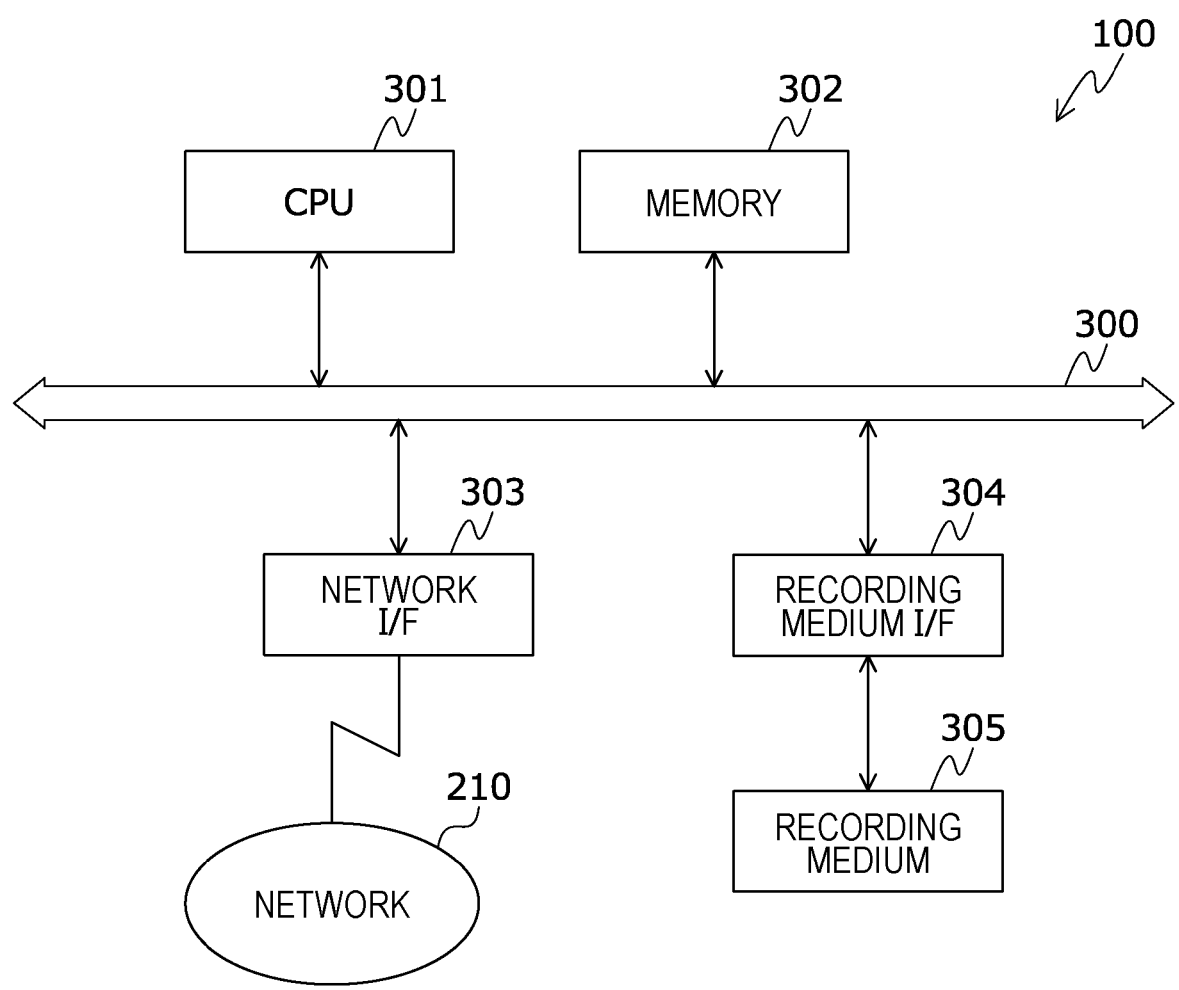
FIG. 3 is a block diagram illustrating a hardware configuration example of an information processing device.

FIG. 3 is a block diagram illustrating a hardware configuration example of the information processing device 100. In FIG. 3, the information processing device 100 includes a central processing unit (CPU) 301, a memory 302, a network interface (I/F) 303, a recording medium I/F 304, and a recording medium 305. Each component is connected by a bus 300.

The CPU 301 controls the entire information processing device 100. The memory 302 includes, for example, a read only memory (ROM), a random access memory (RAM), a flash ROM and so forth. For example, the flash ROM or the ROM stores various programs, and the RAM is used as a work area of the CPU 301. The program stored in the memory 302 is loaded into the CPU 301 to cause the CPU 301 to execute the coded processing. The memory 302 stores, for example, various tables described later with reference to FIGS. 4 to 10.

The network I/F 303 is connected to the network 210 via a communication line, and is connected to another computer via the network 210. The network I/F 303 controls the interface between the network 210 and the inside components, and controls input and output of data from another computer. The network I/F 303 may include, for example, a modem, and a LAN adapter.

The recording medium I/F 304 controls reading/writing of data from/to the recording medium 305 under the control of the CPU 301. The recording medium I/F 304 is, for example, a disk drive, a solid state drive (SSD), or a universal serial bus (USB) port. The recording medium 305 is a nonvolatile memory that stores data written under the control of the recording medium I/F 304. The recording medium 305 is, for example, a disk, a semiconductor memory, a USB memory, or the like. The recording medium 305 may be detachable from the information processing device 100. For example, the recording medium 305 may store various tables described later in FIGS. 4 to 10.

In addition to the above-described components, the information processing device 100 may include a keyboard, a mouse, a display, a printer, a scanner, a microphone, a speaker, and so forth. The information processing device 100 may include a plurality of recording medium I/Fs 304 and a plurality of recording media 305. The information processing device 100 may not include the recording medium I/F 304 or the recording medium 305.

Storage Contents of Time-Series Data Table 400

Next, an example of storage contents of a time-series data table 400 will be described with reference to FIG. 4. The time-series data table 400 is implemented by, for example, a storage area such as the memory 302 or the recording medium 305 of the information processing device 100 illustrated in FIG. 3.

Figure 4:
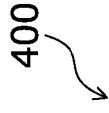
FIG. 4 is an explanatory diagram illustrating an example of storage contents of a time-series data table.

FIG. 4 is an explanatory diagram illustrating an example of storage contents of the time-series data table 400. As illustrated in FIG. 4, the time-series series data table 400 has fields of a data group ID, a data ID, a time o'clock, and contents. The time-series data table 400 stores time-series data by setting information for each piece of data in respective fields.

The data group ID for identifying the time-series data group is set in the field of the data group ID. The data ID for identifying the time-series data included in the time-series data group is set in the data ID field. The time at which the data included in the time-series data is acquired is set in the time o'clock field. The contents of the data included in the time-series data is set in the contents field. In the example of FIG. 4, the contents are IO for at least one of storages.

Storage Contents of individual-feature quantity Table 500

Next, an example of storage contents of an individual-feature quantity table 500 will be described with reference to FIG. 5. The individual-feature quantity table 500 is implemented by, for example, a storage area such as the memory 302 or the recording medium 305 of the information processing device 100 illustrated in FIG. 3.

Figure 5:
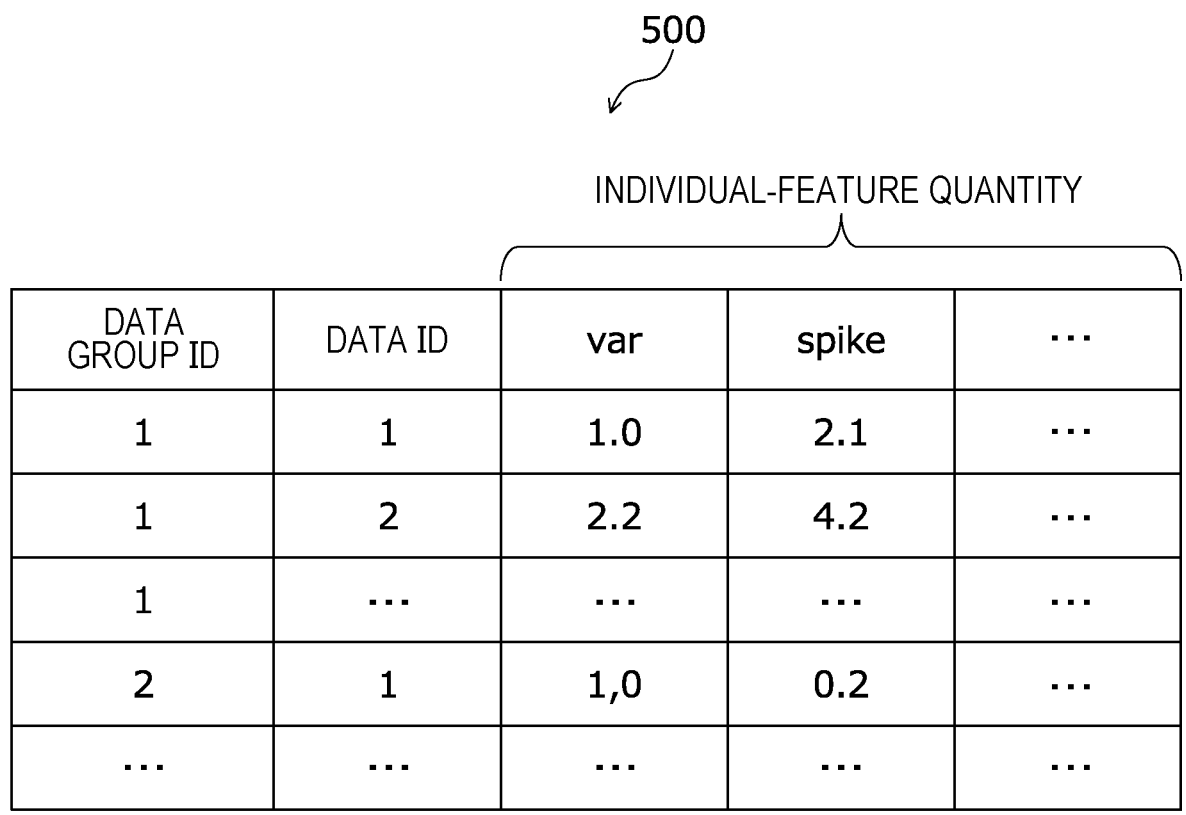
FIG. 5 is an explanatory diagram illustrating an example of storage contents of an individual-feature quantity table.

FIG. 5 is an explanatory diagram illustrating an example of storage contents of the individual-feature quantity table 500. As illustrated in FIG. 5, the individual-feature quantity table 500 has fields of a data group ID, a data ID, and an individual-feature quantity. In the individual-feature quantity table 500, information on the individual-feature quantity is stored as a record by setting information for each piece of time-series data in respective fields.

The data group ID for identifying the time-series data group is set in the field of the data group ID. The data ID for identifying the time-series data included in the time-series data group is set in the data ID field. The individual-feature quantity calculated from time-series data are set in the field of the individual-feature quantity. In the example of FIG. 5, the individual-feature quantities are a var and a spike. The var is a feature quantity indicating the magnitude of data variation, and is a variation level. The spike is a feature quantity indicating the magnitude of instantaneous data variation, and means a spike level.

Storage Contents of Entire-Feature Quantity Table 600

Next, an example of storage contents of an entire-feature quantity table 600 will be described with reference to FIG. 6. The entire-feature quantity table 600 is implemented by, for example, a storage area such as the memory 302 or the recording medium 305 of the information processing device 100 illustrated in FIG. 3.

Figure 6:
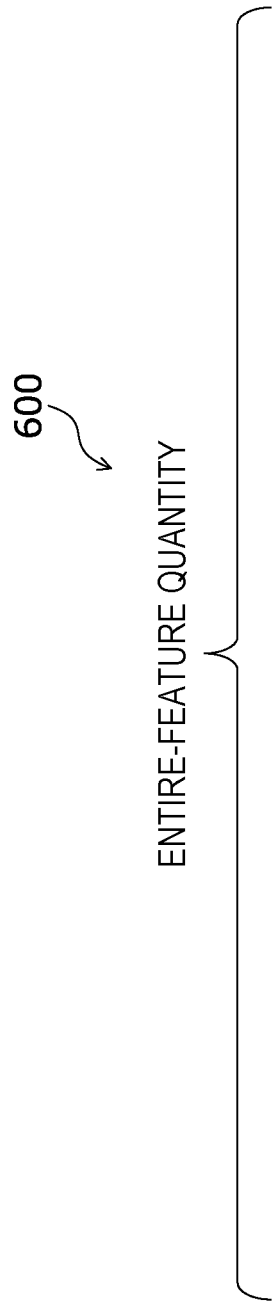
FIG. 6 is an explanatory diagram illustrating an example of storage contents of an entire-feature quantity table.

FIG. 6 is an explanatory diagram illustrating an example of storage contents of the entire-feature quantity table 600. As illustrated in FIG. 6, the entire-feature quantity table 600 has fields of a data group ID and an entire-feature quantity. In the entire-feature quantity table 600, information on the entire-feature quantity is stored as a record by setting information for each time-series data group in respective fields.

The data group ID for identifying the time-series data group is set in the field of the data group ID. The entire-feature quantity of the time-series data group calculated from the individual-feature quantity for each piece of time-series data is set in the field of the entire-feature quantity. In the example of FIG. 6, the entire-feature quantities are a var maximum value, a var minimum value, a spike maximum value, a spike minimum value, and so forth.

Storage Contents of Appearance Flag Table 700

Next, an example of storage contents of an appearance flag table 700 will be described with reference to FIG. 7. The appearance flag table 700 is implemented by, for example, a storage area such as the memory 302 and the recording medium 305 of the information processing device 100 illustrated in FIG. 3.

FIG. 7 is an explanatory diagram illustrating an example of storage contents of the appearance flag table 700. As illustrated in FIG. 7, the appearance flag table 700 has fields of a data group ID and an appearance flag for each type of comment. In the appearance flag table 700, appearance flag information is stored as a record by setting information for each type of comment in respective fields.

The data group ID for identifying the time-series data group is set in the field of the data group ID. Flag information indicating whether a predetermined type of comment appears in a report corresponding to the time-series data group is set in the field of appearance flags for each type of comment. The flag information indicates that the predetermined type of comment does not appear if the flag information represents 0 and that the predetermined type of comment appears if the flag information represents 1. In the example of FIG. 7, the types of comments are an overall maximum value/average value, a momentary high load, a consecutive high load, a small variation, a small load and so forth.

Storage Contents of Attention Level Table 800

Next, an example of storage contents of an attention level table 800 will be described with reference to FIG. 8. The attention level table 800 is implemented by, for example, a storage area such as the memory 302 or the recording medium 305 of the information processing device 100 illustrated in FIG. 3.

Figure 8:
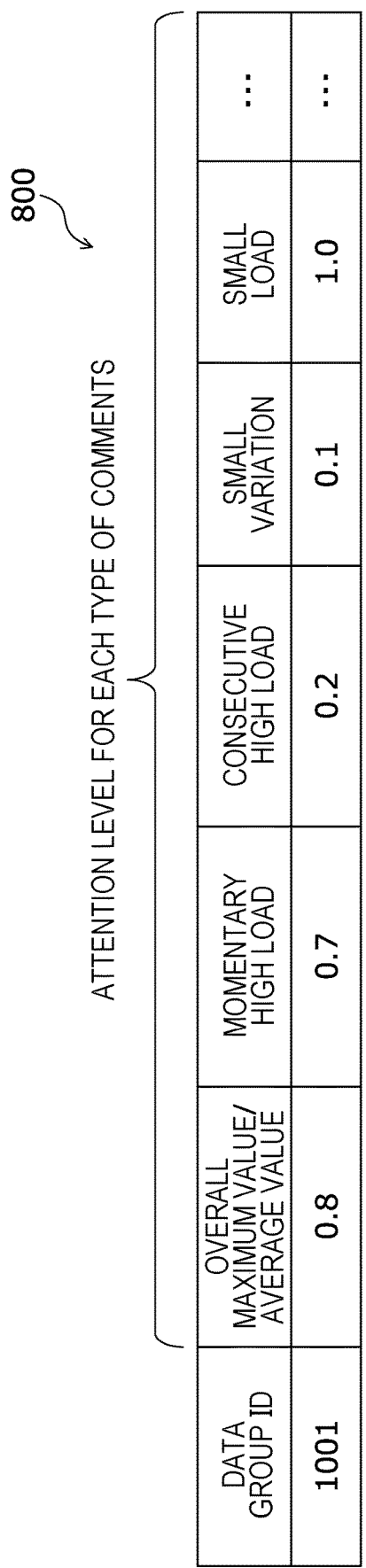
FIG. 8 is an explanatory diagram illustrating an example of storage contents of an attention level table.

FIG. 8 is an explanatory diagram illustrating an example of storage contents of the attention level table 800. As illustrated in FIG. 8, the attention level table 800 has fields of a data group ID and an attention level for each type of comment. In the attention level table 800, attention level information is stored as a record by setting information for each type of comment in respective fields.

The data group ID for identifying the time-series data group is set in the field of the data group ID. The attention level which is an index value indicating whether it is preferable to include a predetermined type of comment in a report is set as a preparation index of the report corresponding to the time-series data group in the field of the attention level for each type of comment. In the example of FIG. 8, the types of comments are overall maximum value/average value, a momentary high load, a consecutive high load, the small variation, a small load and so forth.

Storage Contents of Comment Classification Table 900

Next, an example of storage contents of a comment classification table 900 will be described with reference to FIG. 9. The comment classification table 900 is implemented by, for example, a storage area such as the memory 302 or the recording medium 305 of the information processing device 100 illustrated in FIG. 3.

FIG. 9 is an explanatory diagram illustrating an example of storage contents of the comment classification table 900. As illustrated in FIG. 9, the comment classification table 900 has fields of a classification and a comment. In the comment classification table 900, information on the comment classification is stored as a record by setting information for each type of comment in respective fields.

The type classifying the comment is set in the field of the classification. Templates of a predetermined type of comments are set in the comment field. For example, the template of the comment for the overall maximum value/average value indicates that "the maximum value is a <value 1>, the average value is a <value 2>". Appropriate values may be substituted into the value 1 and the value 2.

Storage Contents of Learning Model Table 1000

Next, an example of storage contents of a learning model table 1000 will be described with reference to FIG. 10. The learning model table 1000 is implemented by, for example, a storage area such as the memory 302 or the recording medium 305 of the information processing device 100 illustrated in FIG. 3.

FIG. 10 is an explanatory diagram illustrating an example of storage contents of the learning model table 1000. As illustrated in FIG. 10, the learning model table 1000 has fields of a node ID, a parent node ID, parent node True/False, a feature quantity, a threshold, an attention level when True, and an attention level when False. In the learning model table 1000, information on the learning model is stored as a record by setting of information for each node in respective fields.

The node ID for identifying a node included in the learning model is set in the field of the node ID. The node ID for identifying a parent node for a predetermined node is set in the field of the parent node ID. Flag information indicating whether the predetermined node is a child node on True side or a child node on False side with respect to the parent node is set in the field of the parent node True/False.

The type of the feature quantity used for the determination condition where the type is indicated by the predetermined node is set in the feature quantity field. The threshold used for a determination condition where the threshold is indicated by a predetermined node is set in the threshold field. The attention level indicated by a leaf node when True branch is the leaf node when True where the feature quantity is equal to or larger than the threshold is set in the field of attention level when True. The attention level indicated by a leaf node when False branch is the leaf node when False where the feature quantity is smaller than the threshold is set in the field of attention level when False.

Relationship of Various Data

Figure 11:
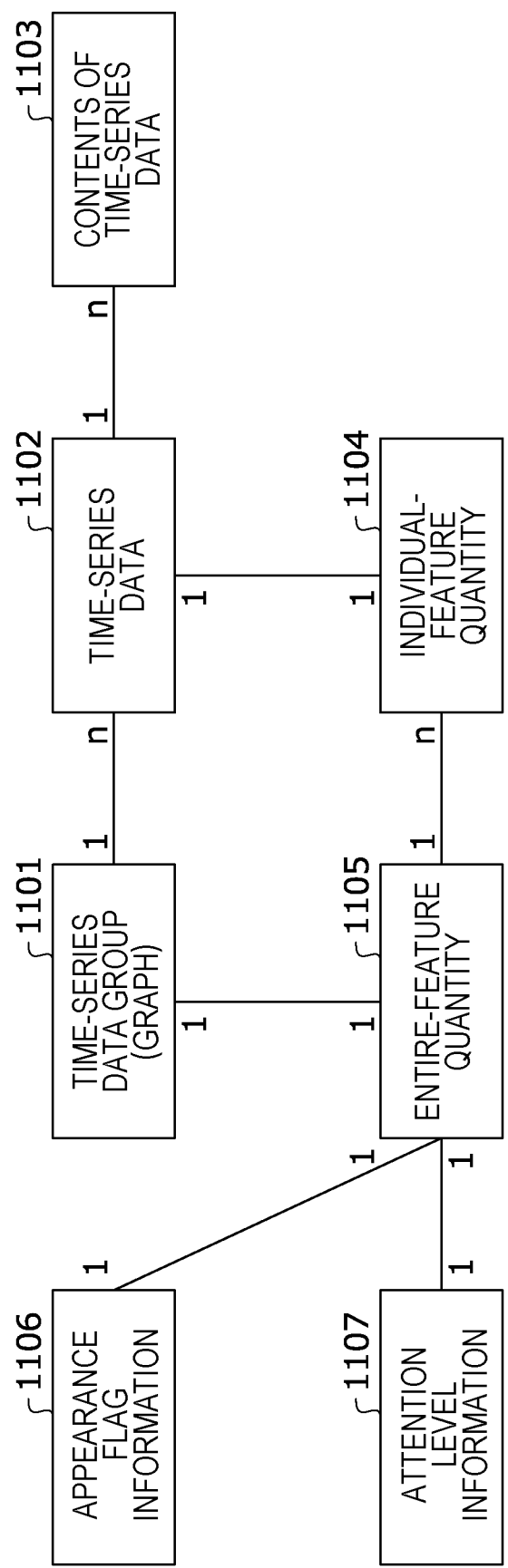
FIG. 11 is an explanatory diagram illustrating the relationship between various data.

FIG. 11 is an explanatory diagram illustrating the relationship between various data.

As illustrated in FIG. 11, the time-series data group 1101 corresponds to the time-series data 1102 in a 1:n manner. The time-series data 1102 corresponds to the time o'clock data content 1103 in a 1:n manner. The time-series data 1102 corresponds to the individual-feature quantity 1104 in a 1:1 manner. The individual-feature quantity 1104 corresponds to the entire-feature quantity 1105 in an n:1 manner, and the time-series data group 1101 corresponds to the entire-feature quantity 1105 in a 1:1 manner. The entire-feature quantity 1105 corresponds to the appearance flag information 1106 in a 1:1 manner, and the entire-feature quantity 1105 corresponds to the attention level information 1107 in a 1:1 manner.

Hardware Configuration Example of Client Device 201

Next, with reference to FIG. 12, a hardware configuration example of the client device 201 included in the report preparation system 200 illustrated in FIG. 2 will be described.

Figure 12:
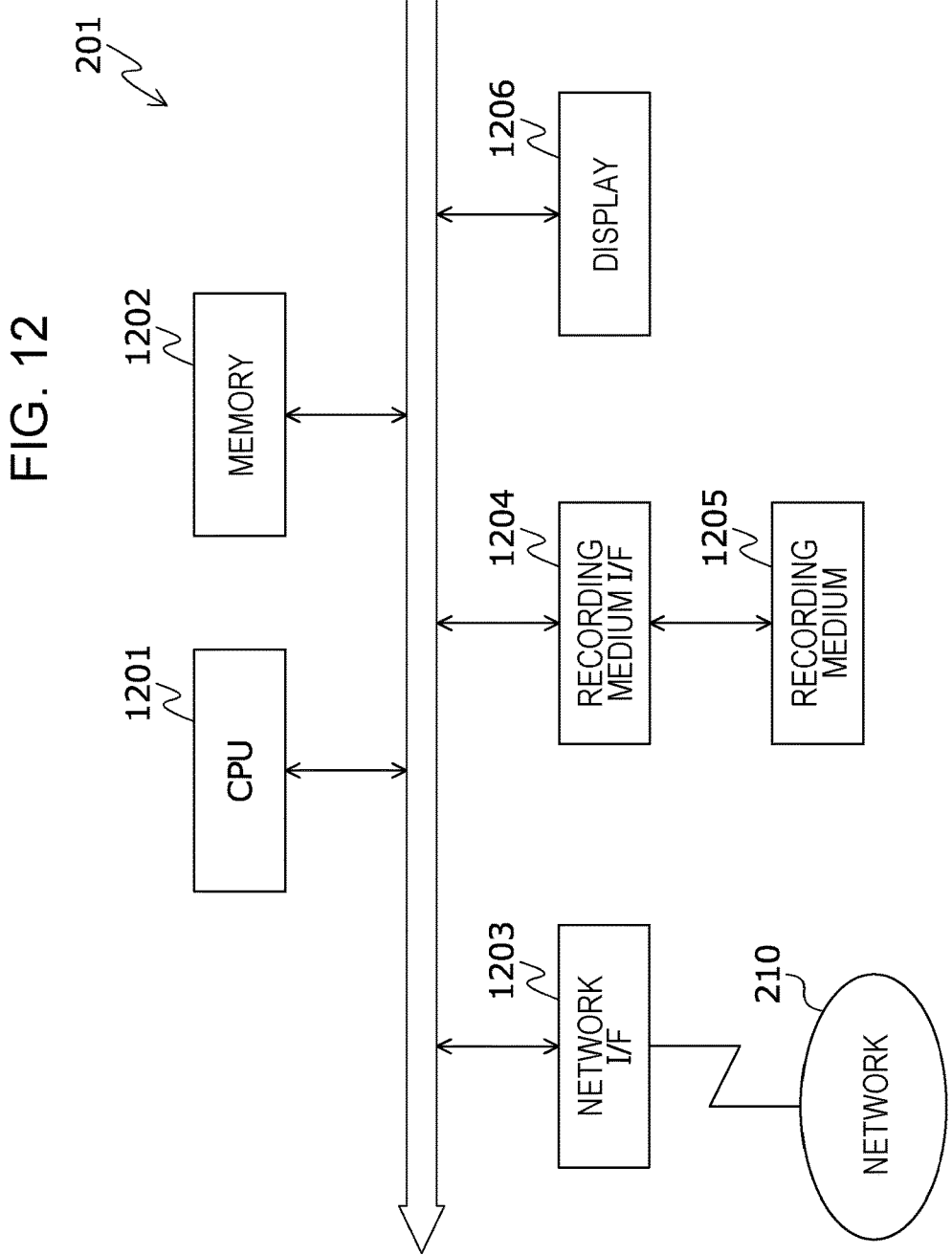
FIG. 12 is a block diagram illustrating a hardware configuration example of a client device.

FIG. 12 is a block diagram illustrating a hardware configuration example of the client device 201. In FIG. 12, the client device 201 includes a CPU 1201, a memory 1202, a network I/F 1203, a recording medium I/F 1204, a recording medium 1205, a display 1206, and an input device 1207. The respective components are connected to each other by a bus 1200.

The CPU 1201 controls the entire client device 201. The memory 1202 includes, for example, a ROM, a RAM, a flash ROM, and so forth. For example, the flash ROM or the ROM stores various programs, and the RAM is used as a work area of the CPU 1201. The program stored in the memory 1202 is loaded into the CPU 1201 to cause the CPU 1201 to execute the coded processing.

The network I/F 1203 is connected to the network 210 via a communication line, and is connected to another computer via the network 210. The network I/F 1203 controls the interface between the network 210 and the inside components, and controls input and output of data from another computer. The network I/F 1203 may include, for example, a modem, and a LAN adapter.

The recording medium I/F 1204 controls reading/writing of data from/to the recording medium 1205 under the control of the CPU 1201. The recording medium I/F 1204 is, for example, a disk drive, an SSD, a USB port, or the like. The recording medium 1205 is a nonvolatile memory that stores data written under the control of the recording medium I/F 1204. The recording medium 1205 is, for example, a disk, a semiconductor memory, a USB memory, or the like. The recording medium 1205 may be detachable from the client device 201.

The display 1206 displays data such as a document, an image, and function information, in addition to a cursor, an icon and a tool box. The display 1206 may be implemented by, for example, a cathode ray tube (CRT), a liquid crystal display, an organic electroluminescence (EL) display, or the like. The input device 1207 has keys for inputting letters, numerals, various instructions, and so forth, and data is input through the input device 1207. The input device 1207 may be a keyboard, a mouse, or the like, or may be a touch panel input pad, a ten-key pad, or the like.

In addition to the above-described components, the client device 201 may include, for example, a printer, a scanner, a microphone, a speaker, or the like. The client device 201 may include a plurality of recording medium I/Fs 1204 and a plurality of recording media 1205. The client device 201 may not include the recording medium I/F 1204 or the recording medium 1205.

Functional Configuration Example of Information Processing Device 100

Next, a functional configuration example of the information processing device 100 will be described with reference to FIG. 13.

Figure 13:
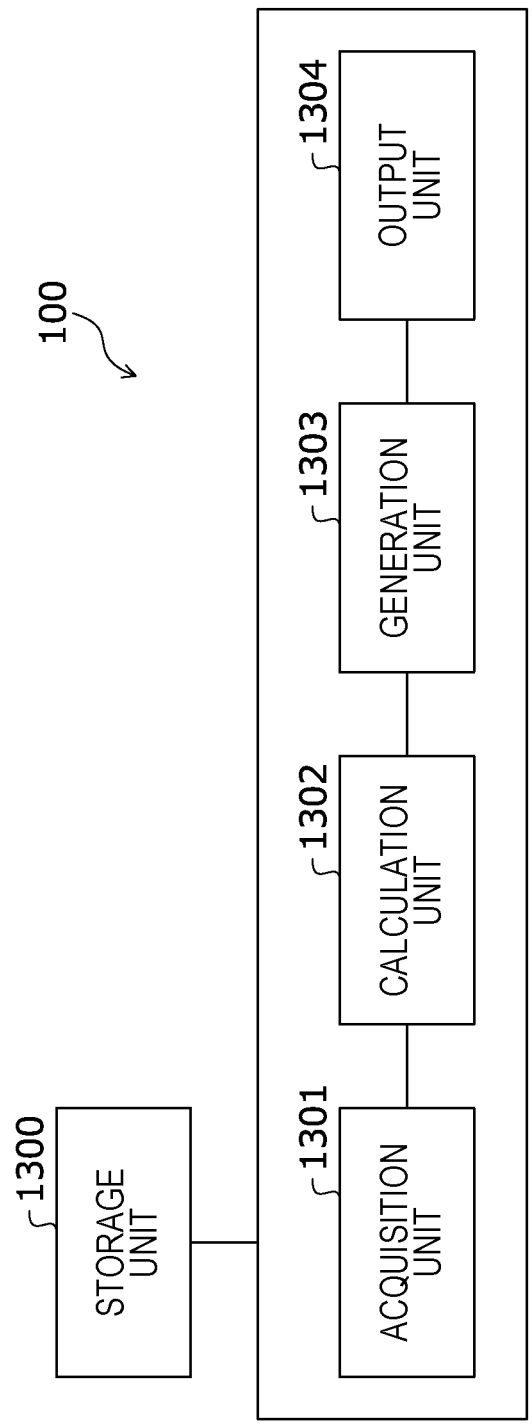
FIG. 13 is a block diagram illustrating a functional configuration example of the information processing device.

FIG. 13 is a block diagram illustrating a functional configuration example of the information processing device 100. The information processing device 100 includes a storage unit 1300, an acquisition unit 1301, a calculation unit 1302, a generation unit 1303, and an output unit 1304.

The storage unit 1300 is implemented by, for example, a storage area such as the memory 302 and the recording medium 305 illustrated in FIG. 3. Hereinafter, a case where the storage unit 1300 is included in the information processing device 100 will be described, but the present embodiment is not limited to this case. For example, the storage unit 1300 may be included in a device different from the information processing device 100, and storage contents of the storage unit 1300 may be referred to from the information processing device 100.

The acquisition unit 1301 to the output unit 1304 function as an example of a control unit. The functions of the acquisition unit 1301 to the output unit 1304 are implemented by causing the CPU 301 to execute a program stored in a storage area such as the memory 302 and the recording medium 305 illustrated in FIG. 3, or by using the network I/F 303. The results processed by each functional unit are stored in, for example, a storage area such as the memory 302 or the recording medium 305 illustrated in FIG. 3.

The storage unit 1300 stores various kinds of information referred to or updated in the processing by each functional unit. The storage unit 1300 stores, for example, a learning model. The learning model is a model representing the relationship between the entire-feature quantity and the contents of the report. For example, the learning model represents, for each type of comment, the relationship between the entire-feature quantity and the index value indicating the appearance frequency of the type of comment in the report. The learning model includes, for example, a tree structure model or a mathematical expression model. The report includes, for example, a comment on at least one of pieces of time-series data.

The storage unit 1300 may store a combination of a learning time-series data group and a report. The storage unit 1300 may store a target time-series data group. The time-series data group is plural pieces of time-series data having an identical attribute. The attribute is, for example, a time zone in which each piece of data included in the time-series data is acquired or measured. The storage unit 1300 may store a machine learning method. The machine learning method is a method of generating a learning model.

The storage unit 1300 may store the individual-feature quantity for each piece of time-series data included in the time-series data group. The individual-feature quantity is a feature quantity representing the magnitude of the data variation of the time-series data. The storage unit 1300 may store the entire-feature quantity of the time-series data group. The entire-feature quantity is a statistical value of the individual-feature quantity. The statistical value is, for example, a minimum value, a maximum value, an average value, a mode value, a median value, or the like. For example, the storage unit 1300 may store various tables described later with reference to FIGS. 4 to 10. Thus, the storage unit 1300 may make various kinds of information available to each functional unit.

The acquisition unit 1301 acquires various kinds of information used for the processing of each functional unit and outputs them to each functional unit. For example, the acquisition unit 1301 may acquire various kinds of information used for the processing of each functional unit from the storage unit 1300. For example, the acquisition unit 1301 may acquire various kinds of information used for the processing of each functional unit from a device different from the information processing device 100. For example, the acquisition unit 1301 may acquire various kinds of information used for the processing of each functional unit from a device different from the information processing device 100 and store the information in the storage unit 1300.

For example, the acquisition unit 1301 may accept a learning time-series data group, or may accept a target time-series data group based on an operation input by a user and output the two time-series data groups to the calculation unit 1302. For example, the acquisition unit 1301 may receive the learning time-series data group, or may receive the target time-series data group from the client device 201 and output the two time-series data groups to the calculation unit 1302. As a result, the acquisition unit 1301 may make various kinds of information available to each functional unit.

Operation in Generating Learning Model

First, the operations of the calculation unit 1302 to the generation unit 1303 when generating a learning model in response to acquiring the learning time-series data group by the acquisition unit 1301 will be described. The calculation unit 1302 to the generation unit 1303 may not perform the operations when generating the learning model if the learning model has been stored in the storage unit 1300.

The calculation unit 1302 calculates the individual-feature quantity for each piece of time-series data included in the time-series data group. The individual-feature quantities are, for example, the var and the spike. For example, the calculation unit 1302 calculates at least one of types of individual-feature quantities for each piece of time-series data included in the time-series data group with respect to each time-series data group of at least one of learning time-series data groups. A specific example of calculating the individual-feature quantity will be described later with reference to FIGS. 18 to 22, for example.

The calculation unit 1302 statistically processes the calculated individual-feature quantity to calculate the entire-feature quantity of the time-series data group. The entire-feature quantities are, for example, a var maximum value, a var minimum value, a spike maximum value, and a spike minimum value. For example, the calculation unit 1302 statistically processes each type of individual-feature quantities with respect to each time-series data group of at least one of learning time-series data groups to calculate at least one of types of entire-feature quantities. Types of individual-feature quantities may not correspond to types of entire-feature quantities in a 1:1 manner. A specific example of calculating the entire-feature quantity will be described later, for example, with reference to FIG. 23. Thus, the calculation unit 1302 may provide the information used for generating the learning model to the generation unit 1303.

The generation unit 1303 generates a learning model. The generation unit 1303 generates the learning model based on, for example, at least one of learning time-series data groups and the contents of the report for the at least one of time-series data groups. For example, the generation unit 1303 calculates, for each type of comment, the entire-feature quantity and the index value indicating the appearance frequency of the type of comment in the report using the machine learning method, and generates the learning model. A specific example of generating the learning model will be described later, for example, with reference to FIG. 25 and FIG. 26. As a result, the generation unit 1303 may make the learning model available.

Operation in Supporting Preparation of Report

Next, the operations of the calculation unit 1302 to the generation unit 1303 when supporting the preparation of a report in response to acquiring the target time-series data group by the acquisition unit 1301 will be described.

The calculation unit 1302 calculates the individual-feature quantity for each piece of time-series data included in the time-series data group. The individual-feature quantities are, for example, the var and the spike. For example, the calculation unit 1302 calculates at least one of types of individual-feature quantities for each piece of time-series data included in the target time-series data group. A specific example of calculating the individual-feature quantity will be described later, for example, with reference to FIGS. 18 to 22 and FIG. 28.

The calculation unit 1302 statistically processes the calculated individual-feature quantity to calculate the entire-feature quantity of the time-series data group. The entire-feature quantities are, for example, a var maximum value, a var minimum value, a spike maximum value, and a spike minimum value. For example, the calculation unit 1302 statistically processes each type of individual-feature quantities with respect to the target time-series data group, and calculates at least one of types of entire-feature quantities. Types of individual-feature quantities may not correspond to types of entire-feature quantities in a 1:1 manner. A specific example of calculating the entire-feature quantity will be described later, for example, with reference to FIG. 23 and FIG. 28. As a result, the calculation unit 1302 may provide information to be input to the learning model to the generation unit 1303.

The generation unit 1303 refers to the learning model and generates information on the contents of the report corresponding to the calculated entire-feature quantity. For example, the generation unit 1303 refers to the learning model and generates an index value corresponding to the calculated entire-feature quantity for each type of comment. A specific example of generating the index value will be described later, for example, with reference to FIG. 29 and FIG. 30. As a result, the generation unit 1303 may support the preparation of the report.

For example, the generation unit 1303 may refer to the learning model and may generate a comment on at least at least one of pieces of time-series data included in the accepted time-series data group based on the index value corresponding to the calculated entire-feature quantity for each type of comment. A specific example of generating a comment will be described later, for example, with reference to FIG. 31 and FIG. 32. As a result, the generation unit 1303 may support the preparation of the report.

The generation unit 1303 may select at least one of pieces of time-series data for generating the comment among the accepted time-series data group, for example, based on the calculated individual-feature quantity or a feature quantity for each piece of time-series data included in the time-series data group where the feature quantity is other than the calculated individual-feature quantity. For example, the generation unit 1303 may select, as the time-series data for generating the comment, the time-series data which is the calculation source of the individual-feature quantity used for the type of comment for which the index value is the maximum.

For example, the generation unit 1303 may refer to the maximum value in each piece of time-series data that is not used as an index value, and may select the time-series data having the largest maximum value as time-series data for generating the comment. As a result, the generation unit 1303 may generate the comment on the time-series data having a relatively high importance level, making it easy to prepare the report describing the comment in consideration of importance level of time-series data. The generation unit 1303 may reduce the processing amount.

The output unit 1304 outputs various kinds of information. The output format is, for example, display on a display, print out to a printer, transmission to an external device by the network I/F 303, or storage in a storage area such as the memory 302 or the recording medium 305.

For example, the output unit 1304 may output the learning model generated by the generation unit 1303. The output unit 1304 stores, for example, the learning model generated by the generation unit 1303 in the storage unit 1300. As a result, the output unit 1304 may support the preparation of the report. As a result, the output unit 1304 may make the learning model available.

For example, the output unit 1304 may output information on the contents of the report generated by the generation unit 1303. The output unit 1304 causes to display, for example, information on the contents of the report generated by the generation unit 1303 on the display of the client device 201. As a result, the output unit 1304 may support the preparation of the report.

For example, the output unit 1304 may output the results processed by each functional unit. Thus, the output unit 1304 may notify the user of the results processed by each functional unit, and may support the management and operation of the information processing device 100, for example, update of the setting values of the information processing device 100, whereby it is possible to improve the usability of the information processing device 100.

Specific Functional Configuration Example of Information Processing Device 100

Next, a specific functional configuration example of the information processing device 100 will be described with reference to FIG. 14.

Figure 14:
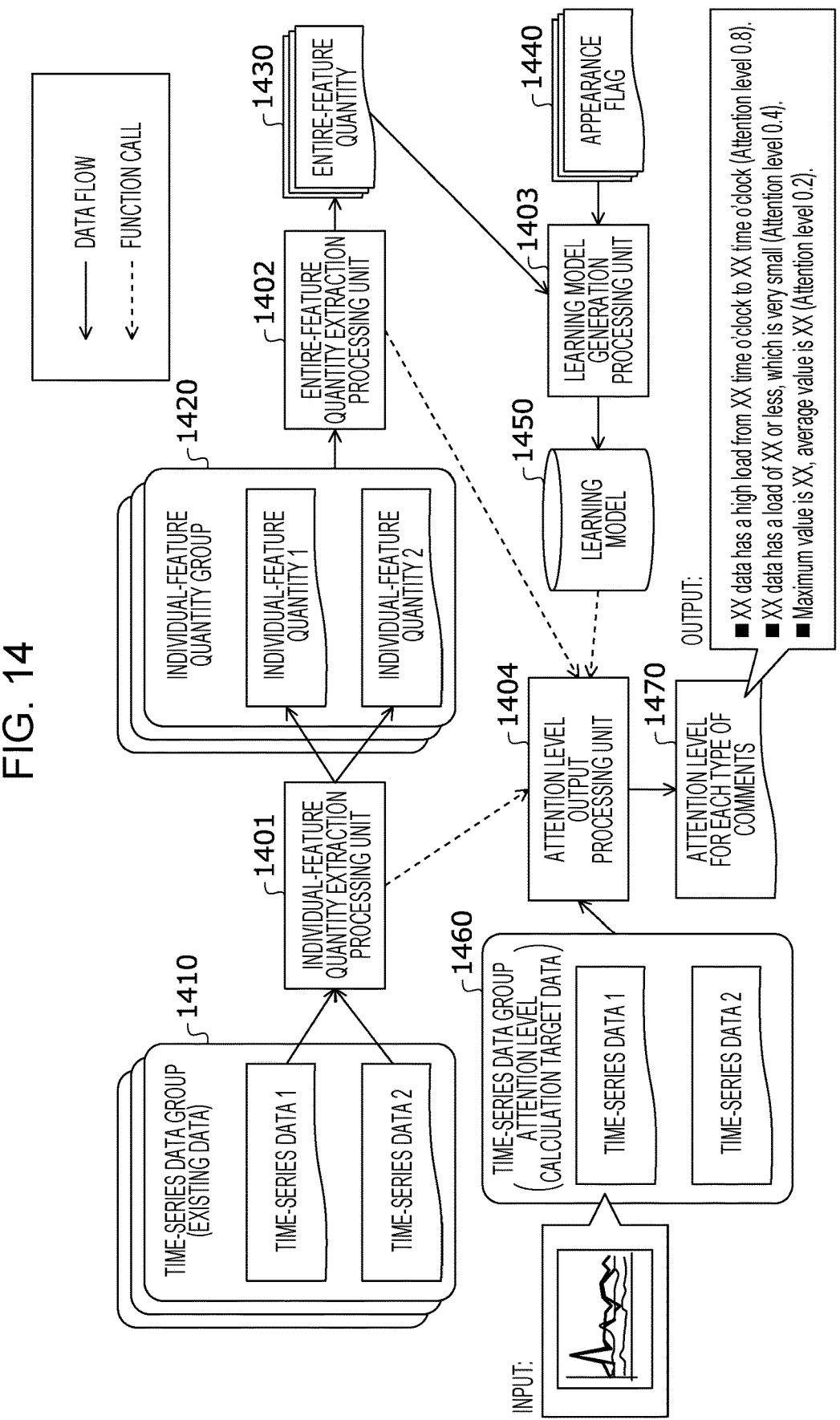
FIG. 14 is a block diagram illustrating a specific functional configuration example of the information processing device.

FIG. 14 is a block diagram illustrating a specific functional configuration example of the information processing device 100. The information processing device 100 includes an individual-feature quantity extraction processing unit 1401, an entire-feature quantity extraction processing unit 1402, a learning model generation processing unit 1403, and an attention level output processing unit 1404.

The individual-feature quantity extraction processing unit 1401 accepts the input of at least one of learning time-series data groups 1410. The at least one of learning time-series data groups 1410 are stored in the time-series data table 400, for example. When the at least one of learning time-series data groups 1410 are input, the individual-feature quantity extraction processing unit 1401 calculates individual-feature quantity for each piece of time-series data included in the learning time-series data groups 1410, and outputs an individual-feature quantity group 1420 for each time-series data group 1410. For example, the individual-feature quantity group 1420 for each learning time-series data group 1410 is stored in the individual-feature quantity table 500.

The entire-feature quantity extraction processing unit 1402 accepts the input of the individual-feature quantity group 1420 for each learning time-series data group 1410. When the individual-feature quantity group 1420 for each learning time-series data group 1410 is input, the entire-feature quantity extraction processing unit 1402 calculates and outputs the entire-feature quantity 1430 for each learning time-series data group 1410. The entire-feature quantity 1430 for each learning time-series data group 1410 is stored, for example, using the entire-feature quantity table 600.

The learning model generation processing unit 1403 accepts the input of the entire-feature quantity 1430 for each learning time-series data group 1410 and the input of an appearance flag 1440 for each type of comment. The appearance flag 1440 for each type of comment is stored, for example, using the appearance flag table 700. The learning model generation processing unit 1403 inputs, into the machine learning method, the entire-feature quantity 1430 for each learning time-series data group 1410 as an explanatory variable and the appearance flag 1440 for each type of comment as a target variable to create a learning model 1450. The learning model 1450 is stored, for example, using the learning model table 1000.

The attention level output processing unit 1404 accepts the input of a target time-series data group 1460. The target time-series data group 1460 is stored in, for example, the time-series data table 400. When the target time-series data group 1460 is input, the attention level output processing unit 1404 calls the individual-feature quantity extraction processing unit 1401 and causes the attention level output processing unit 1404 to calculate the individual-feature quantity group for each piece of time-series data included in the target time-series data group 1460. The individual-feature quantity group for each piece of time-series data included in the target time-series data group 1460 is stored in, for example, the individual-feature quantity table 500.

The attention level output processing unit 1404 accepts the input of the individual-feature quantity for each piece of time-series data included in the target time-series data group 1460. The attention level output processing unit 1404 calls the entire-feature quantity extraction processing unit 1402 and causes the entire-feature quantity extraction processing unit 1402 to calculates the entire-feature quantity of the target time-series data group 1460 based on the individual-feature quantity for each piece of time-series data included in the target time-series data group 1460. The entire-feature quantity of the target time-series data group 1460 is stored, for example, using the entire-feature quantity table 600.

The attention level output processing unit 1404 accepts the input of the entire-feature quantity of the target time-series data group 1460. The attention level output processing unit 1404 inputs the entire-feature quantity of the target time-series data group 1460 in the learning model 1450, and calculates and outputs an attention level 1470 for each type of comment. The attention level 1470 is an index value indicating whether it is preferable to include a predetermined type of comment in a report as a preparation index of the report corresponding to the target time-series data group 1460. The attention level 1470 is stored using, for example, the attention level table 800.

The attention level output processing unit 1404 may further prepare the report based on the attention level 1470 for each type of comment. As a result, the information processing device 100 may make it easier to prepare a report representing the entire feature of the target time-series data group 1460. The information processing device 100 may reduce the work burden of preparing the report representing the entire feature of the target time-series data group 1460.

Flow of Operation of Information Processing Device 100

Next, the flow of the operation of the information processing device 100 will be described with reference to FIG. 15.

Figure 15:
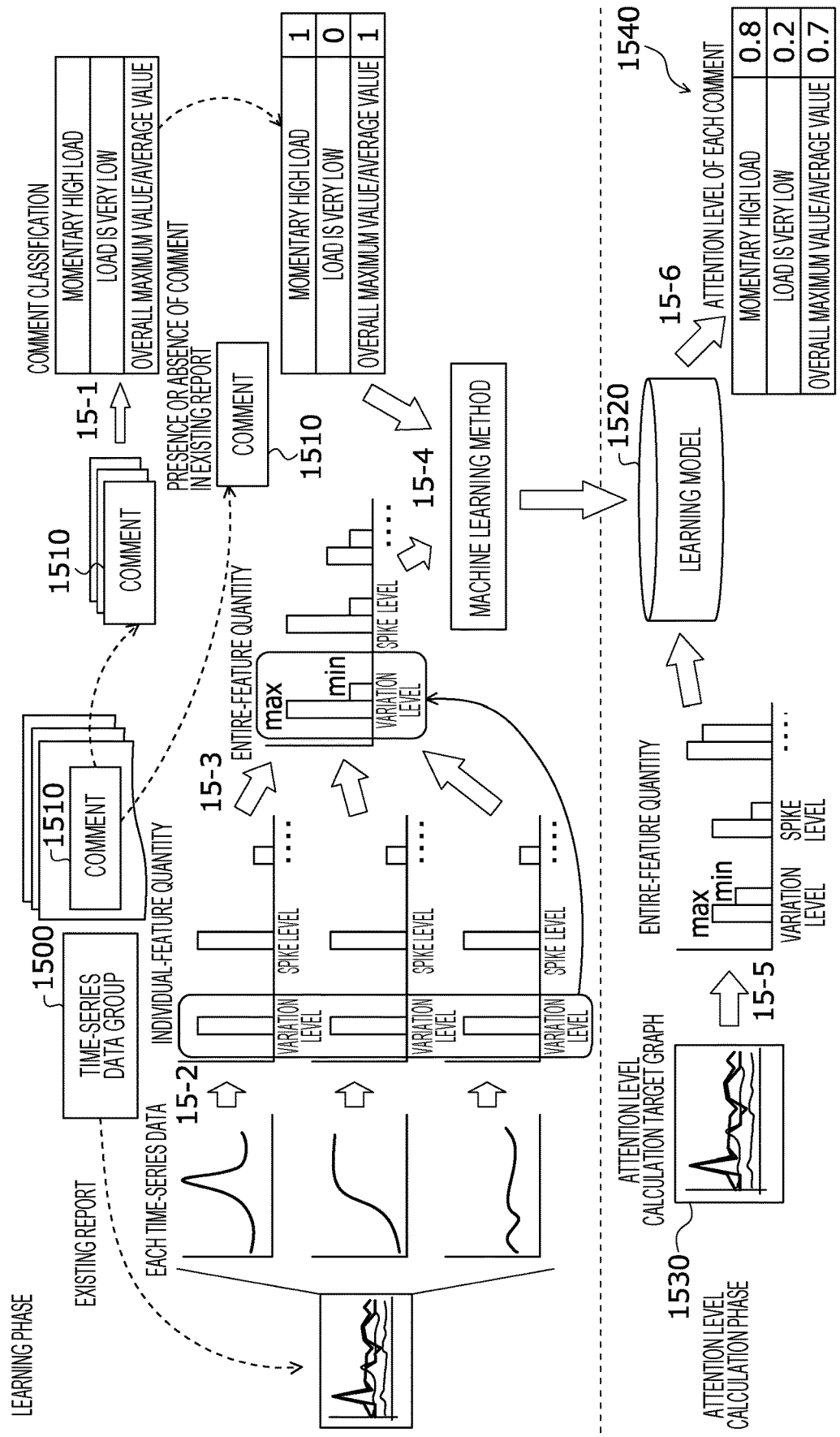
FIG. 15 is an explanatory diagram illustrating a flow of operations of the information processing device.

FIG. 15 is an explanatory diagram illustrating the flow of the operation of the information processing device 100. In FIG. 15, the information processing device 100 operates in a learning phase for generating a learning model and an attention level calculation phase for supporting the preparation of the report. First, the operation in the learning phase will be described.

Learning Phase

Using a document analysis technique, the information processing device 100 classifies the comments 1510 described in the report corresponding to each of at least one of learning time-series data groups 1500, and specifies the types of comments 1510. The types of comments 1510 are, for example, overall maximum value/average value, momentary high load, consecutive high load, small variation, small load, very small load, and so forth. The information processing device 100 may specify the types of comments 1510 based on an operation input by a user. The information processing device 100 generates flag information indicating whether the comment appears in a report corresponding to the learning time-series data group 1500 for each type of comment 1510. (15-1)

The information processing device 100 calculates the individual-feature quantity for each piece of time-series data included in the time-series data group 1500 with respect to each time-series data group 1500 of the at least one of learning time-series data groups 1500. The individual-feature quantities are a var and a spike. The var is a feature quantity indicating the magnitude of data variation, and is a variation level. The spike is a feature quantity indicating the magnitude of instantaneous data variation, and means a spike level. (15-2)

The information processing device 100 calculates the entire-feature quantity based on individual-feature quantity for each piece of time-series data included in the time-series data group 1500 with respect to each time-series data group 1500 of the at least one of learning time-series data groups 1500. The entire-feature quantities are, for example, a var maximum value, a var minimum value, a spike maximum value, and a spike minimum value. (15-3)

The information processing device 100 inputs the entire-feature quantity of the learning time-series data group 1500 as an explanatory variable in the machine learning method and inputs the appearance flag for each type of comment 1510 as target variables to generate a learning model 1520. As a result, the information processing device 100 may make the learning model 1520 available. (15-4)

Since the information processing device 100 generates the learning model 1520 using the entire-feature quantity obtained by integrating the individual-feature quantity of each piece of time-series data included in the time-series data group, the relationship between the time-series data in the time-series data group may be reflected in the learning model 1520. Since the information processing device 100 unifies the number of types of entire-feature quantities between the time-series data groups 1500 and uses the entire-feature quantity as an explanatory variable, the information processing device 100 may make the learning model 1520 applicable regardless of the number of pieces of time-series data included in the time-series data group 1500.

Attention Level Calculation Phase

The information processing device 100 calculates at least one of types of individual-feature quantities for each piece of time-series data included in a target time-series data group 1530. The information processing device 100 calculates the entire-feature quantity of the target time-series data group 1530 based on at least one of types of individual-feature quantities calculated for each piece of time-series data included in the target time-series data group 1530. (15-5)

The information processing device 100 inputs the entire-feature quantity of the target time-series data group 1530 in the learning model 1520, and calculates and outputs the attention level for each type of comment. For example, the information processing device 100 calculates the attention level "0.8" for the type of comment which is "momentary high load". The information processing device 100 may prepare a report based on the attention level for each type of comment. As a result, the information processing device 100 may make it easier to prepare a report representing the entire feature of the target time-series data group 1530. (15-6)

Since the information processing device 100 inputs the entire-feature quantity obtained by integrating the individual-feature quantity of the time-series data included in the time-series data group in the learning model 1520, the attention level reflecting the relationship between the time-series data in the time-series data group may be calculated. The information processing device 100 may reduce the work burden of preparing the report representing the entire feature of the target time-series data group 1530. Even when label information or the like useful for preparing a comment is not assigned to each piece of time-series data included in the target time-series data group 1530, the information processing device 100 may prepare a report representing the entire feature of the target time-series data group 1530.

Operation Example of Information Processing Device 100

Next, an operation example of the information processing device 100 will be described with reference to FIGS. 16 to 33. For example, an example of operation in which the information processing device 100 generates a learning model will be described with reference to FIGS. 16 to 27, and an example of operation in which the information processing device 100 supports the preparation of the report will be described with reference to FIGS. 28 to 33. First, an example of classifying comments will be described with reference to FIGS. 16 and 17.

FIGS. 16 and 17 are explanatory diagrams illustrating an example of classifying comments. In FIG. 16, the information processing device 100 acquires reports 1601 to 1603. The reports 1601 to 1603 correspond to the time-series data groups to which data group IDs 1 to 3 are allocated, respectively. The information processing device 100 extracts comments from the reports 1601 to 1603 and classifies the comments. The information processing device 100 stores the result of classifying comments using the comment classification table 900. Next, the description of FIG. 17 will be made.

In FIG. 17, the information processing device 100 determines, for each type of comment, whether the type of comment appears in each of the reports 1601 to 1603. The information processing device 100 stores the determined result using the appearance flag table 700. An example of calculating the individual-feature quantity will be described with reference to FIG. 18.

Figure 18:
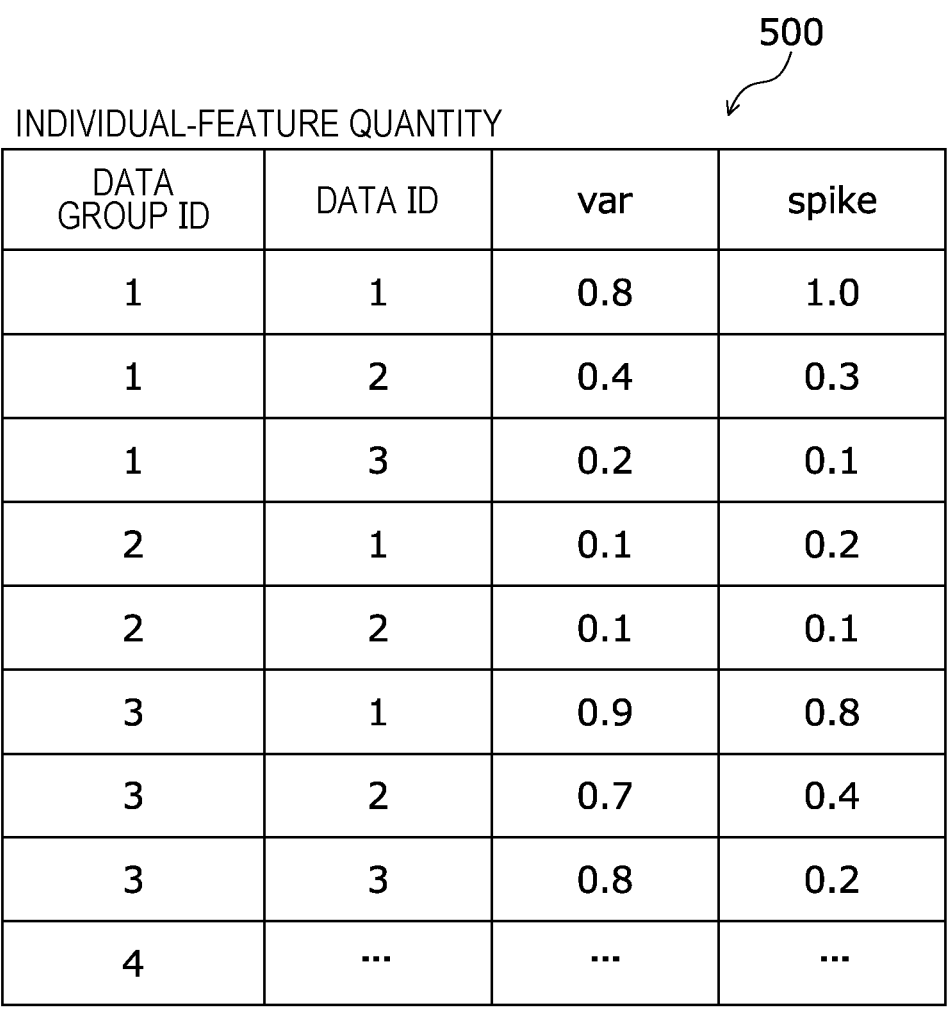
FIG. 18 is an explanatory diagram illustrating an example of calculating individual-feature quantity.

FIG. 18 is an explanatory diagram illustrating an example of calculating individual-feature quantity. In FIG. 18, the information processing device 100 calculates individual-feature quantity normalized in the range of 0 to 1 for each piece of time-series data included in each of the time-series data groups to which the data group IDs 1 to ID 3 are allocated. The individual-feature quantities are, for example, the var and the spike. An example of a method of calculating the individual-feature quantity will be described with reference to FIG. 19.

FIG. 19 is an explanatory diagram illustrating an example of a method of calculating individual-feature quantity. A table 1900 of FIG. 19 illustrates the individual-feature quantity ID in association with the method of calculating individual-feature quantity. As illustrated in FIG. 19, the var is a feature quantity indicating the magnitude of data variation calculated from the maximum value−the minimum value. The spike is a feature quantity indicating the magnitude of instantaneous data variation calculated by (80% percentile value−median value)/(maximum value−median value).

The high_num is a feature quantity indicating a state of a high load which is calculated from the maximum value of the frequency in which the data value is larger than the average value consecutively. The high_val_sum is calculated from the maximum value of $\Sigma$ (data value−average value) in data in which the data value is larger than the average value consecutively. The ave_ratio is calculated from the average value in the time-series data/the average value in the time-series data group. A specific example of the calculation method will be described with reference to FIGS. 20 to 22.

Figure 20:
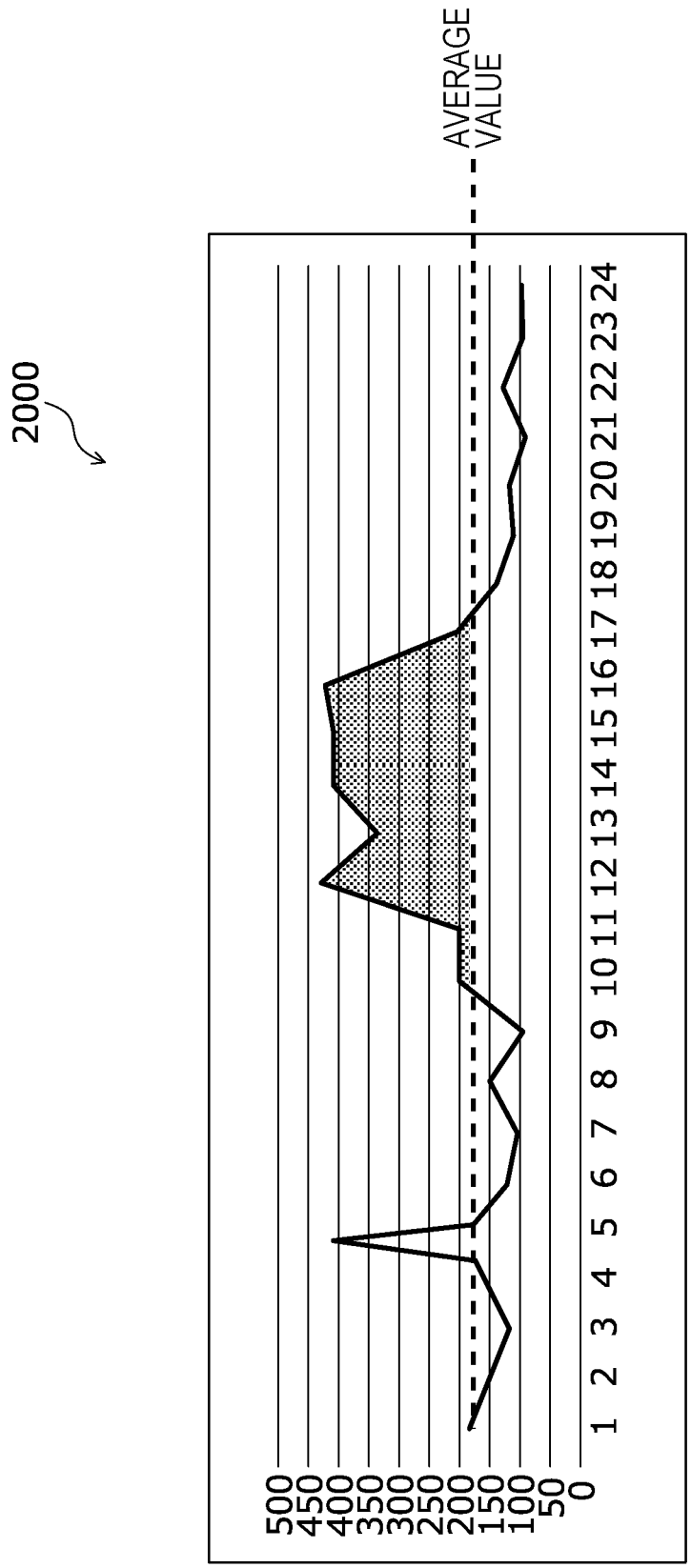
FIG. 20 is an explanatory diagram (Part 1) illustrating a specific example of a calculation method.
Figure 21:
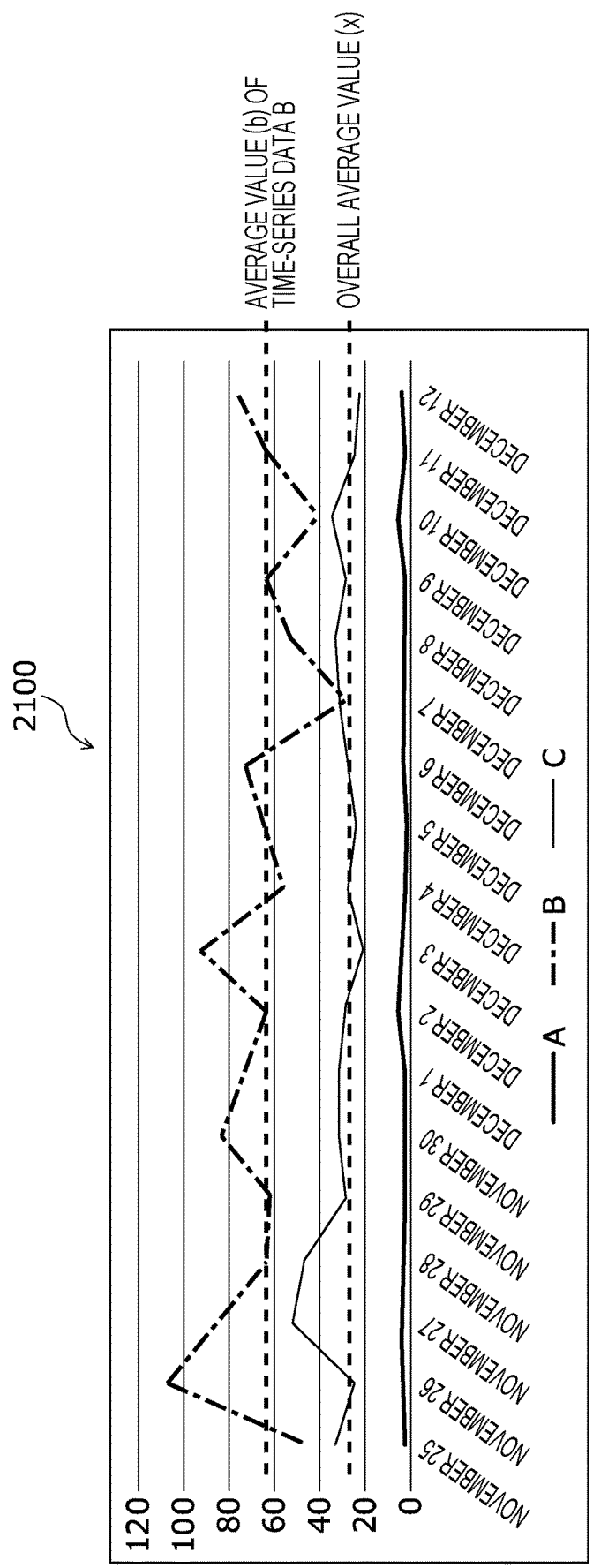
FIG. 21 is an explanatory diagram (Part 2) illustrating a specific example of the calculation method.
Figure 22:
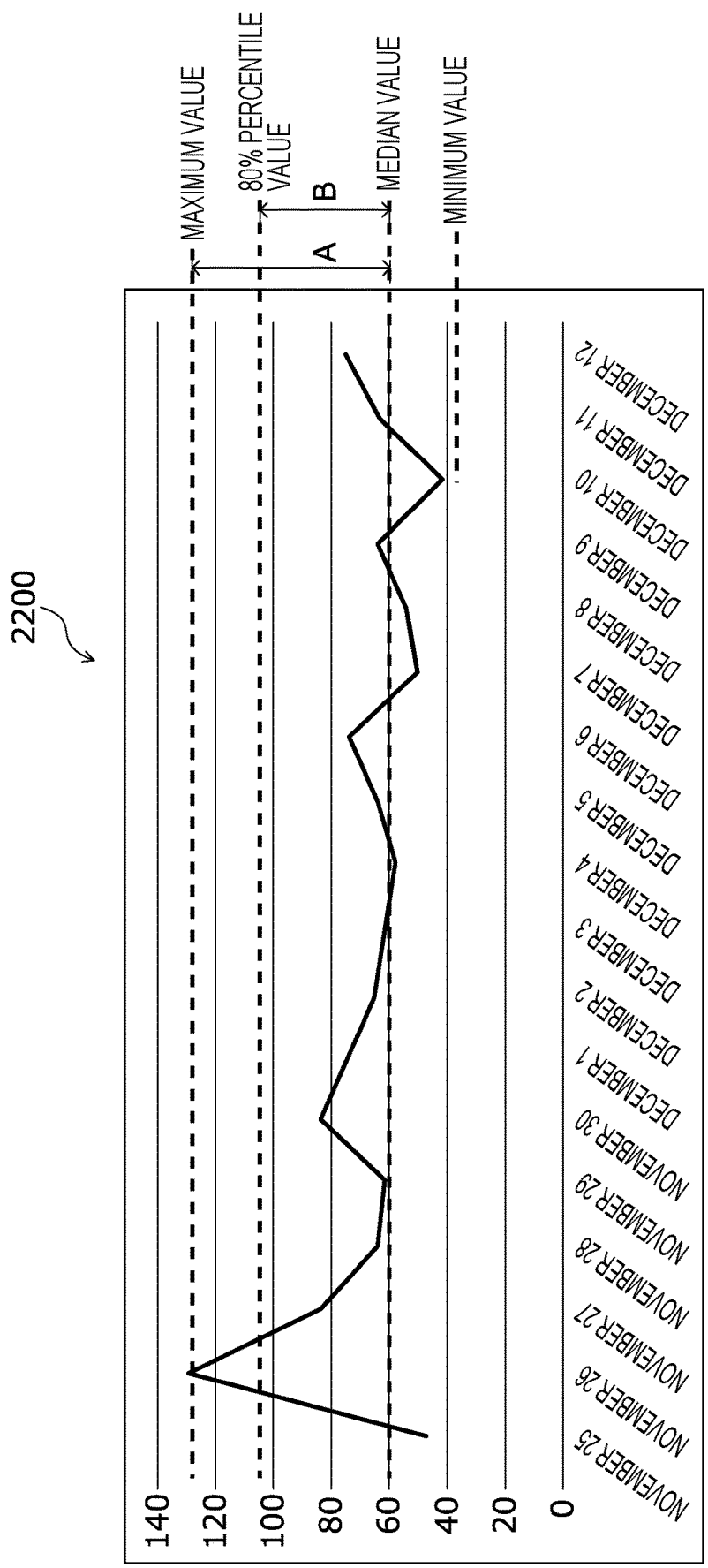
FIG. 22 is an explanatory diagram (part 3) illustrating a specific example of the calculation method.

FIGS. 20 to 22 are explanatory diagrams illustrating specific examples of the calculation method. A graph 2000 in FIG. 20 illustrates a specific example of a method of calculating the high_num and the high_val_sum. The high_num is the number of data points whose values are consecutively equal to or more than the average value. If there is a plurality of ranges where there is the number of data points whose values are consecutively equal to or more than the average value, the high_num is a maximum value of the number of data points whose values are consecutively equal to or more than the average value. The high_val_sum is an area of a range where there is the number of data points whose values are consecutively equal to or more than the average value. If there are a plurality of ranges where there is the number of data points whose values are consecutively equal to or more than the average value the high_val_sum is a maximum value of the areas of the ranges where there is the number of data points whose values are consecutively equal to or more than the average value. Next, the description of FIG. 21 will be made.

A graph 2100 of FIG. 21 illustrates a specific example of the method of calculating the ave_ratio. In the example of FIG. 21, the time-series data group includes time-series data A, time-series data B, and time-series data C. In this case, the ave_ratio for the time-series data B is obtained by the formula of (the average value (b) of the time-series data B)/(the average value (x) in the time-series data group). Next, the description of FIG. 22 will be made.

The graph 2200 in FIG. 22 illustrates a specific example of the calculation method of the var and the spike. The var is obtained by the formula of (the maximum value−the minimum value). The spike is obtained by the formula of (80% percentile value−median value)/(maximum value−median value), and indicates that the larger the value, the larger the protrusion of the maximum value is. An example of calculating the entire-feature quantity of the learning time-series data group will be described with reference to FIG. 23.

FIG. 23 is an explanatory diagram illustrating an example of calculating the entire-feature quantity of the learning time-series data group. In FIG. 23, the information processing device 100 calculates the entire-feature quantity of the time-series data group of the data group ID 1 based on a record 501 of the individual-feature quantity table 500 corresponding to the data group ID 1, and adds a record 601 to the entire-feature quantity table 600. Similarly, the information processing device 100 calculates the entire-feature quantity of the time-series data group of the data group ID 2 based on a record 502 of the individual-feature quantity table 500 corresponding to the data group ID 2, and adds a record 602 to the entire-feature quantity table 600.

Similarly, the information processing device 100 calculates the entire-feature quantity of the time-series data group of the data group ID 3 based on a record 503 of the individual-feature quantity table 500 corresponding to the data group ID 3, and adds a record 603 to the entire-feature quantity table 600. In this manner, the information processing device 100 may calculate entire-feature quantities having the same number of types for each time-series data group irrespective of the number of time-series data included in the time-series data group, and may handles the time-series data group uniformly. Features of the learning time-series data group will be described with reference to FIG. 24.

FIG. 24 is an explanatory diagram illustrating the features of the learning time-series data group. A table 2400 of FIG. 24 illustrates the relationship between the entire-feature quantity of the learning time-series data group corresponding to each of the data group IDs 1 to 3, which are specified in the above, and the comment appearing in the record corresponding to the learning time-series data group.

For example, what relationship exists between presence or absence of the comment whose type is "small variation" and the entire-feature quantity obtained by integrating the individual-feature quantity of each piece of the time-series data included in the time-series data group is specified. For this reason, the information processing device 100 may reflect the relationship between the time-series data in the time-series data group and may generate a learning model that is applicable irrespective of the number of time-series data included in the time-series data group 1500. Next, an example of generating a learning model will be described with reference to FIGS. 25 and 26.

Figure 25:
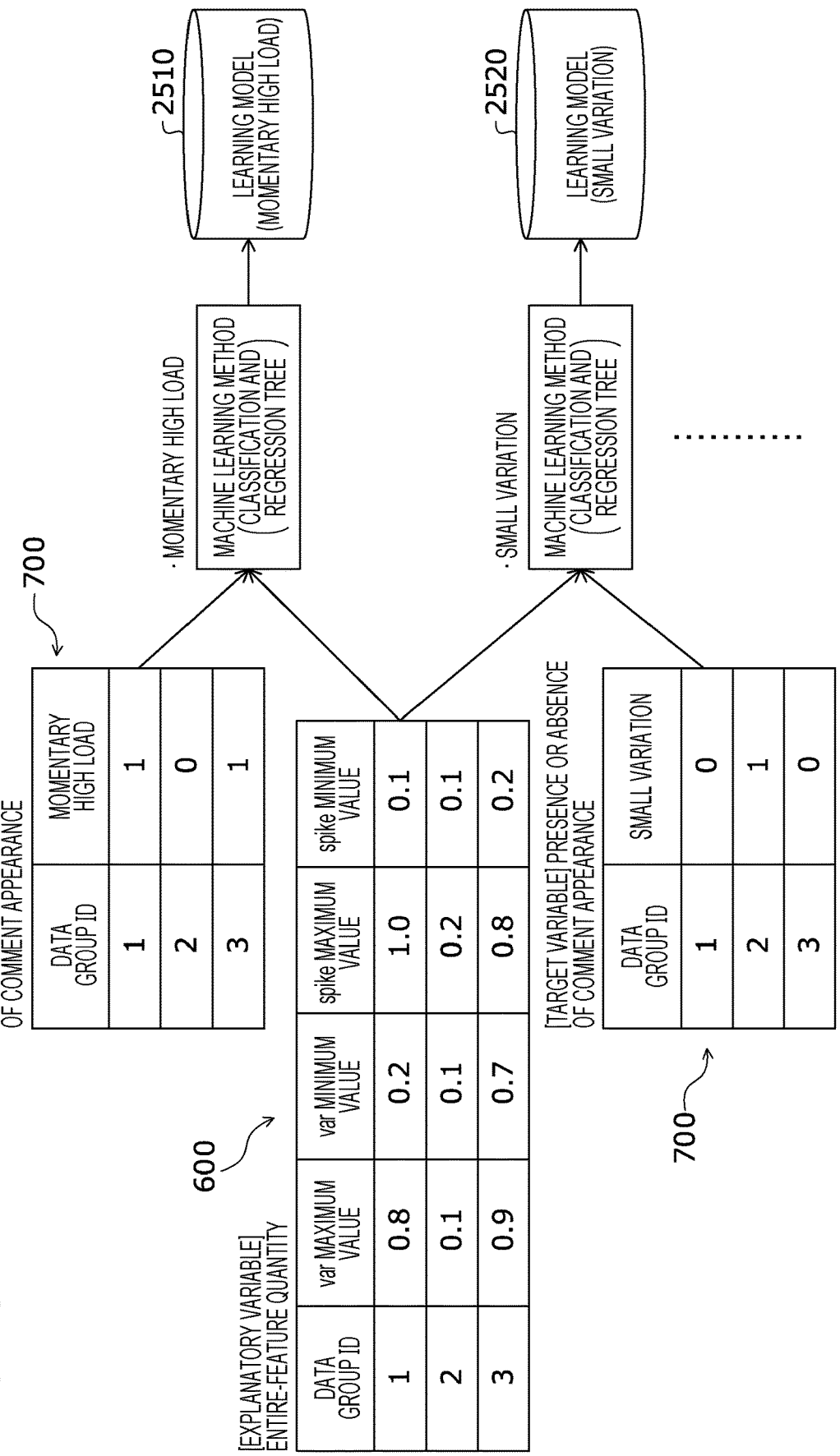
FIG. 25 is an explanatory diagram (part 1) illustrating an example of generating a learning model.
Figure 26:
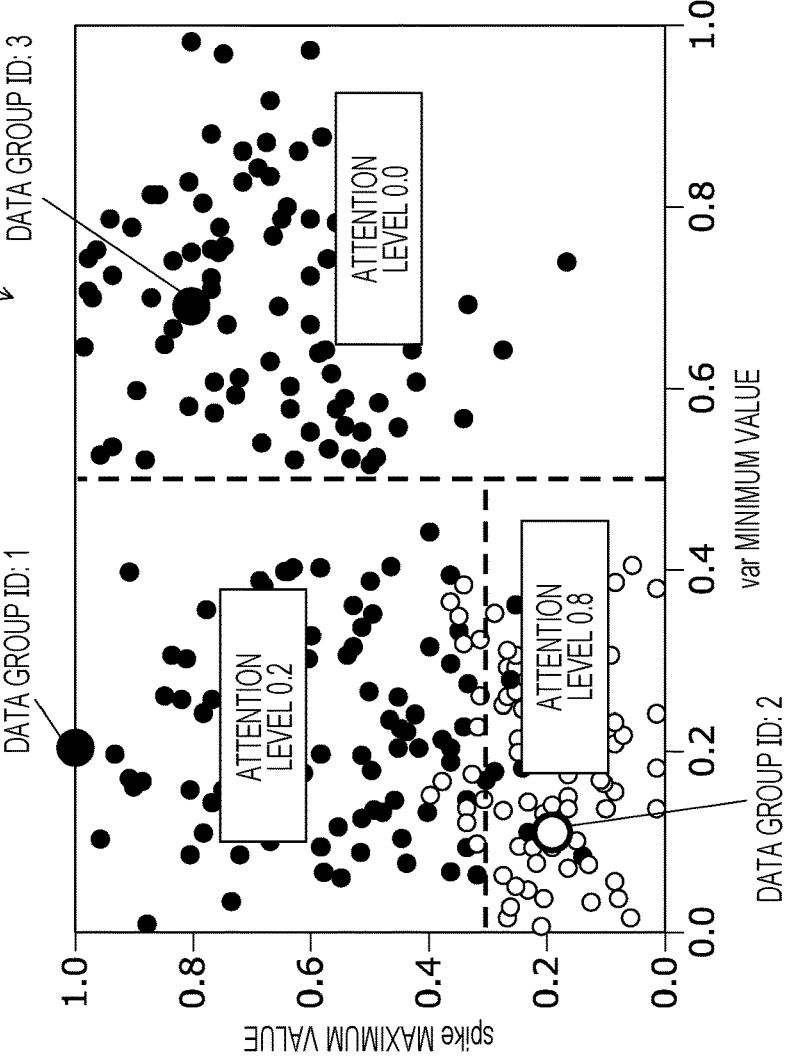
FIG. 26 is an explanatory diagram (part 2) illustrating an example of generating the learning model.

FIGS. 25 and 26 are explanatory diagrams illustrating an example of generating the learning model. In FIG. 25, the information processing device 100 generates a learning model for each type of comment using a machine learning method. The machine learning method is, for example, a classification and regression tree (CART).

For example, the information processing device 100 generates a learning model 2510 in which the entire-feature quantity is an input and the attention level of the comment whose type is "momentary high load" is an output. For example, the information processing device 100 generates a learning model 2520 in which the entire-feature quantity is an input and the attention level of the comment whose type is "small variation" is an output. Next, with reference to the description of FIG. 26, an example in which the machine learning method determines the attention level will be described with the learning model 2510 as an example.

A table 2600 in FIG. 26 is a table in which points corresponding to combinations of entire-feature quantities corresponding to each time-series data group of at least one of learning time-series data groups are arranged in a space with the entire-feature quantity as the axis. The color of the point indicates whether the comment whose type is "small variation" appears in the report corresponding to the time-series data group. Black indicates no comment appear. White indicates the comment appears.

In the machine learning method, the classification and regression tree as the learning model 2510 is generated with the maximum depth of the classification and regression tree as 2. In the machine learning method, for example, the space with the entire-feature quantity as the axis is divided so that a collection of time-series data groups in which the comment whose type is "small variation" appears and a collection of time-series data groups in which the comments whose type is "small variation" does not appear are efficiently divided. In the example of FIG. 26, in the machine learning method, a space with the var minimum value and the spike maximum value, which are the entire-feature quantity, as the axes is divided into three regions.

In the machine learning method, the proportion of white points out of the points included in the divided region is calculated as the attention level of the comment whose type is "small variation". In the machine learning method, a classification and regression tree to be the learning model 2510 is generated based on the value of the entire-feature quantity which is the boundary of the region and the calculated attention level, and is stored using the learning model table 1000. Next, with reference to FIG. 27, the relationship between the learning time-series data group and the learning model 2510 will be explained.

Figure 27:
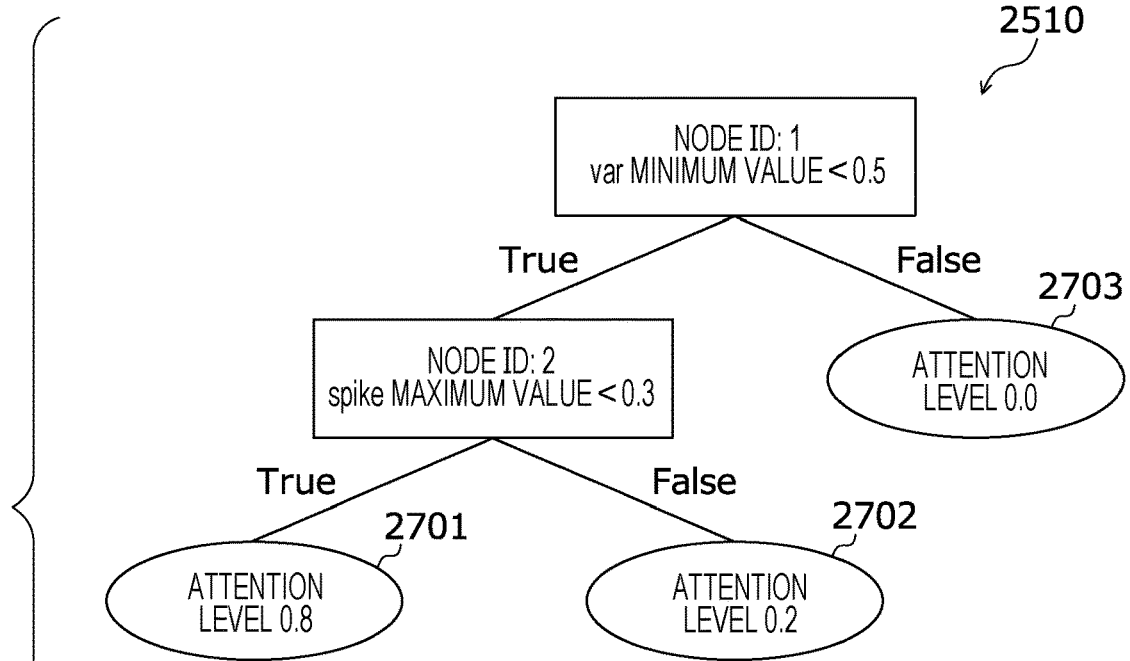
FIG. 27 is an explanatory diagram illustrating the relationship between a learning model and a learning time-series data group.

FIG. 27 is an explanatory diagram illustrating the relationship between the learning model 2510 and the learning time-series data group. As illustrated in FIG. 27, in the learning model 2510, in consideration of the relationship between the time-series data, the importance level of the time-series data, and so forth, it is possible to specify whether it is preferable to describe a comment whose type is "small variation" in the report corresponding to the time-series data group.

Since the time-series data group of the data group ID 1 includes the time-series data having the momentary high load, the importance level of the time-series data is relatively high, and the comment whose type is "small variation" may not be described. According to the learning model 2510, the time-series data group of the data group ID 1 may be classified into a leaf node 2702 based on the entire-feature quantity of the time-series data group of the data group ID 1. As a result, the learning model 2510 makes it possible to calculate the attention level 0.2 of the comment whose type is "small variation" with respect to the time-series data group of the data group ID 1, and it is also possible to specify that the comment whose type is "small variation" may not be described.

Since in the time-series data group of the data group ID 2, all time-series data has a small variation, it is preferable to describe the comment whose type is "small variation". According to the learning model 2510, the time-series data group of the data group ID 2 may be classified into a leaf node 2701 based on the entire-feature quantity of the time-series data group of the data group ID 2. As a result, the learning model 2510 makes it possible to calculate the attention level 0.8 of the comment whose type is "small variation" with respect to the time-series data group of the data group ID 2, and it is possible to specify that it is preferable to describe the comment whose type is "small variation".

Since in the time-series data group of the data group ID 3, all time-series data fluctuates greatly, it is preferable not to describe the comment whose type is "small variation". According to the learning model 2510, the time-series data group of the data group ID 3 may be classified into a leaf node 2703 based on the entire-feature quantity of the time-series data group of the data group ID 3. As a result, the learning model 2510 makes it possible to calculate the attention level 0.0 of the comment whose type is "small variation" with respect to the time-series data group of the data group ID 3, and it is possible to specify that it is preferable not to describe the comment whose type is "small variation".

Next, with reference to FIGS. 28 to 33, description will be given of an operation example in which the information processing device 100 accepts the target time-series data group and supports the preparation of the report on the target time-series data group. First, an example of calculating the entire-feature quantity of the target time-series data group will be described with reference to FIG. 28.

FIG. 28 is an explanatory diagram illustrating an example of calculating the entire-feature quantity of the target time-series data group. With respect to the target time-series data group, as in FIGS. 18 to 23, the information processing device 100 calculates the individual-feature quantity to store the calculated individual-feature quantity using the individual-feature quantity table 500, and calculates the entire-feature quantity to store the calculated entire-feature quantity using the entire-feature quantity table 600.

As a result, the information processing device 100 may calculate a predetermined number of types of entire-feature quantities irrespective of the number of pieces of time-series data included in the target time-series data group, and may calculate the entire-feature quantity that may be input to the learning model 2510. Next, an example of calculating the attention level of the target time-series data group will be described with reference to FIGS. 29 and 30.

Figure 29:
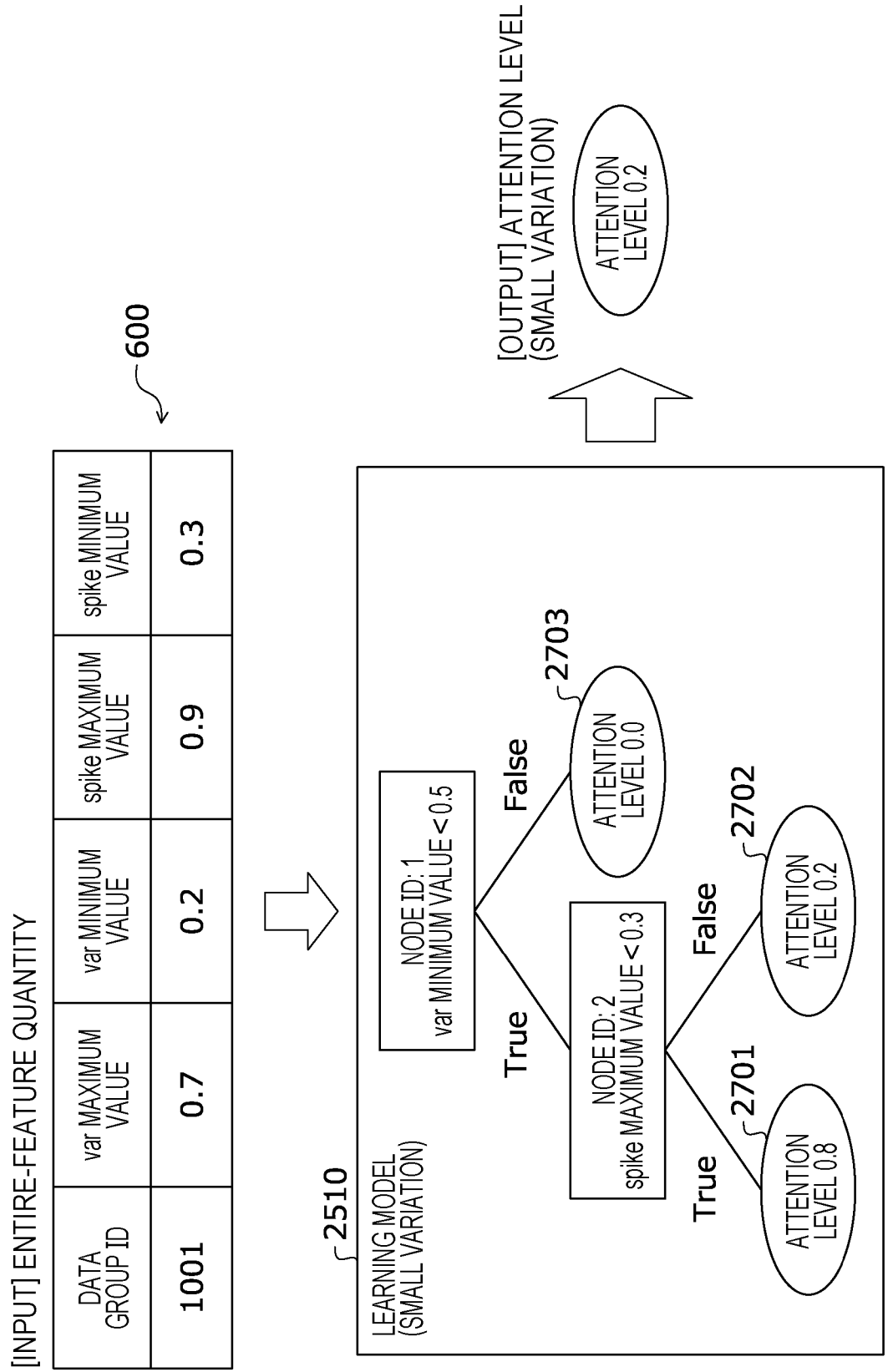
FIG. 29 is an explanatory diagram (part 1) illustrating an example of calculating an attention level of a target time-series data group.
Figure 30:
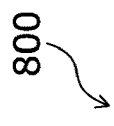
FIG. 30 is an explanatory diagram (part 2) illustrating an example of calculating an attention level of the target time-series data group.

FIGS. 29 and 30 are explanatory diagrams illustrating an example of calculating an attention level of the target time-series data group. In FIG. 29, the information processing device 100 inputs the entire-feature quantity of the target time-series data group to the learning model 2510.

For example, the learning model 2510 classifies the target time-series data group into the node with the node ID 1, which is the root node. Since the var minimum value of the entire-feature quantity of the target time-series data group is less than 0.5 in the node of the node ID 1, the learning model 2510 determines that the result is True and classifies the target time-series data group into the node of node ID 2.

Since the spike maximum value of the entire-feature quantity of the target time-series data group is not less than 0.3 in the node of node ID 2, the learning model 2510 determines that the result is False and classifies the target time-series data group into the node 2702, which is a leaf node. The learning model 2510 outputs the attention level 0.2 of the comment whose type is "small variation" indicated by the leaf node 2702. Next, the description of FIG. 30 will be made.

In FIG. 30, the information processing device 100 similarly calculates the attention level of the comment whose type is other than the type which is "small variation" by using a learning model corresponding to the comment whose type is other than the type which is "small variation". The information processing device 100 stores the calculated attention level using the attention level table 800. Next, the description of FIG. 31 will be made.

FIG. 31 is an explanatory diagram illustrating an example of selecting the type of comment described in the report. In FIG. 31, the information processing device 100 selects the type of comment to be described in the report based on the attention level. For example, the information processing device 100 selects, as the type of comment to be described in the report, the type whose attention level is the maximum, that is, "overall maximum value/average value". The information processing device 100 acquires a record 3100 corresponding to the selected type of comment from the comment classification table 900.

For example, the information processing device 100 may select, as the type of comment to be described in the report, a type whose attention level is equal to or greater than a certain level. For example, the information processing device 100 may select, as the type of comment to be described in the report, a predetermined number of types in order from the type whose attention level is the maximum. Next, the description of FIG. 32 will be made.

FIG. 32 is an explanatory diagram illustrating an example of generating the comment described in the report. The information processing device 100 generates a selected type of comment. For example, the information processing device 100 selects any time-series data included in the time-series data group, and generates a comment using the template of the comments set in the acquired record 3100. In the example of FIG. 32, the information processing device 100 generate a comment 3200, that is, "the maximum value is 120, and the average value is 50".

When selecting the time-series data for generating a comment, the information processing device 100 selects the time-series data based on the individual-feature quantity of the time-series data, a feature quantity other than the individual-feature quantity, or the like. For example, when selecting the time-series data for generating a comment, the information processing device 100 selects the time-series data base on the individual-feature quantity corresponding to the type of comment, the feature quantity corresponding to the type of comment not used for the individual-feature quantity or the like.

Since, for example, the type is "overall maximum value/average value", the information processing device 100 refers to the maximum value of each piece of time-series data in order to select the time-series data for generating a comment. The information processing device 100 selects the time-series data having the largest maximum value among the time-series data group. Upon generating the comment, the information processing device 100 generates and outputs the report in which the comment is described. Next, a specific example of the output result will be described with reference to FIG. 33.

Figure 33:
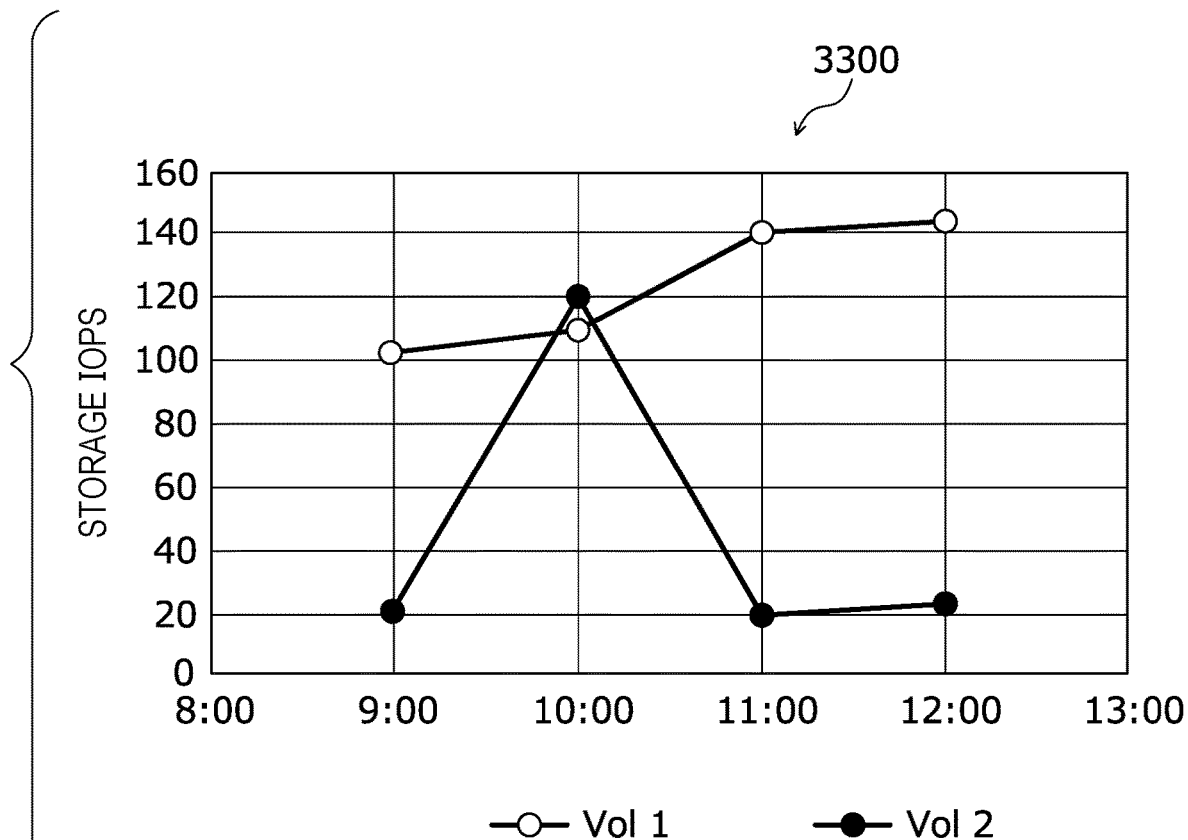
FIG. 33 is an explanatory diagram illustrating a specific example of an output result.

FIG. 33 is an explanatory diagram illustrating a specific example of the output result. In FIG. 33, the information processing device 100 generates a comment with the time-series data group illustrated in a table 3300 as a target time-series data group, and outputs a report in which the comment is described. In the example of FIG. 33, the information processing device 100 outputs a report in which a comment 3301 is described.

Although a technique may be conceivable in which a comment for each piece of time-series data is generated, a report in which a comment 3302 is described is likely to be output with the technique. In this case, it is difficult for the user to grasp at a first glance which time-series data has a relatively high importance level and which part represent a feature in any of the time-series data On the other hand, since the information processing device 100 outputs a report in which the comment 3301 is described, it is possible to output a report that makes it easy to grasp at a first glance the featured event and data among the time-series data group. Therefore, the information processing device 100 may easily grasp which part represents the entire feature of the time-series data group. The information processing device 100 may easily grasp which time-series data has a relatively high importance level, and which time-series data is preferable to check, thereby easily grasping the relationship between the time-series data.

In the examples of FIGS. 28 to 33, the case where the information processing device 100 selects the type of comment to be described in the report based on the attention level and prepares the report is described, but the present embodiment is not limited to this case. For example, the information processing device 100 may change the display mode for each type of comment described in the report based on the attention level. For example, the information processing device 100 may highlight a comment whose type has an attention level which is higher than a certain level, and prepare a report that displays without distinction a comment whose type has an attention level which is less than a certain level.

For example, the information processing device 100 may change the display order for each type of comment described in the report based on the attention level. For example, the information processing device 100 may prepare a report in descending order from the comment whose type has an attention level which is high.

Learning Model Generation Processing Procedure

Next, an example of the learning model generation processing procedure performed by the information processing device 100 will be described with reference to FIG. 34. The learning model generation processing is implemented, for example, by the CPU 301, a storage area such as the memory 302 and the recording medium 305, and the network I/F 303 illustrated in FIG. 3.

Figure 34:
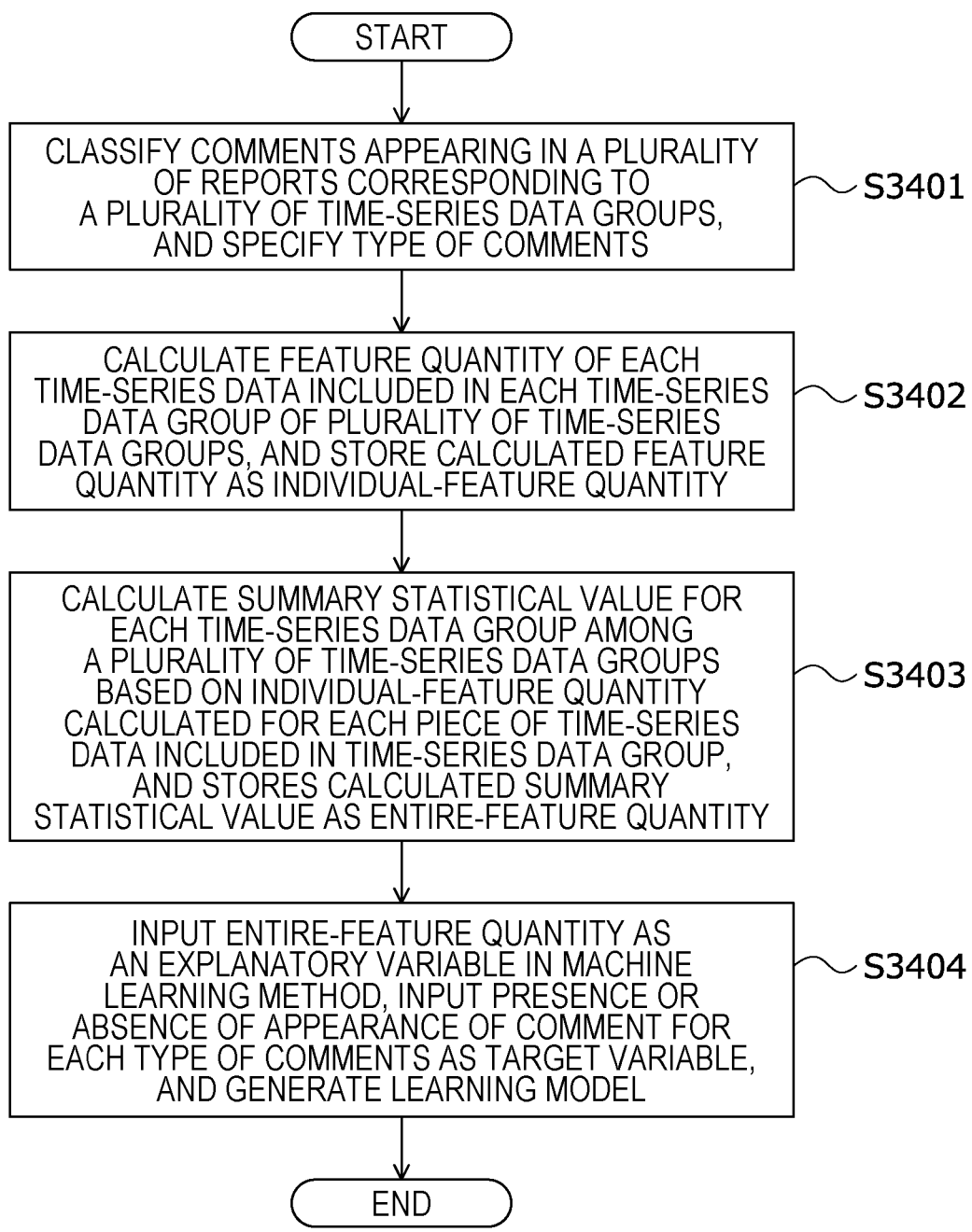
FIG. 34 is a flowchart illustrating an example of a learning model generation processing procedure.

FIG. 34 is a flowchart illustrating an example of the learning model generation processing procedure. In FIG. 34, first, the information processing device 100 classifies comments appearing in a plurality of reports corresponding to a plurality of time-series data groups, and specifies the type of the comments (step S3401).

Next, the information processing device 100 calculates the feature quantity of each piece of time-series data included in each time-series data group of the plurality of time-series data groups and stores the calculated feature quantity as the individual-feature quantity (step S3402). The information processing device 100 calculates a summary statistical value for each time-series data group among a plurality of time-series data groups based on the individual-feature quantity calculated for each time-series data included in the time-series data group, and stores the calculated summary statistical value as the entire-feature quantity (step S3403).

Next, in step S3404, the information processing device 100 inputs the entire-feature quantity as an explanatory variable in the machine learning method, inputs the presence or absence of the appearance of the comment for each type of comment as a target variable, and generates a learning model. The information processing device 100 ends the learning model generation processing. As a result, the information processing device 100 may make the learning model available.

Report Preparation Processing Procedure

Next, an example of the report preparation processing procedure performed by the information processing device 100 will be described with reference to FIG. 35. The report preparation processing is implemented, for example, by the CPU 301, a storage area such as the memory 302 and the recording medium 305, and the network I/F 303 illustrated in FIG. 3.

Figure 35:
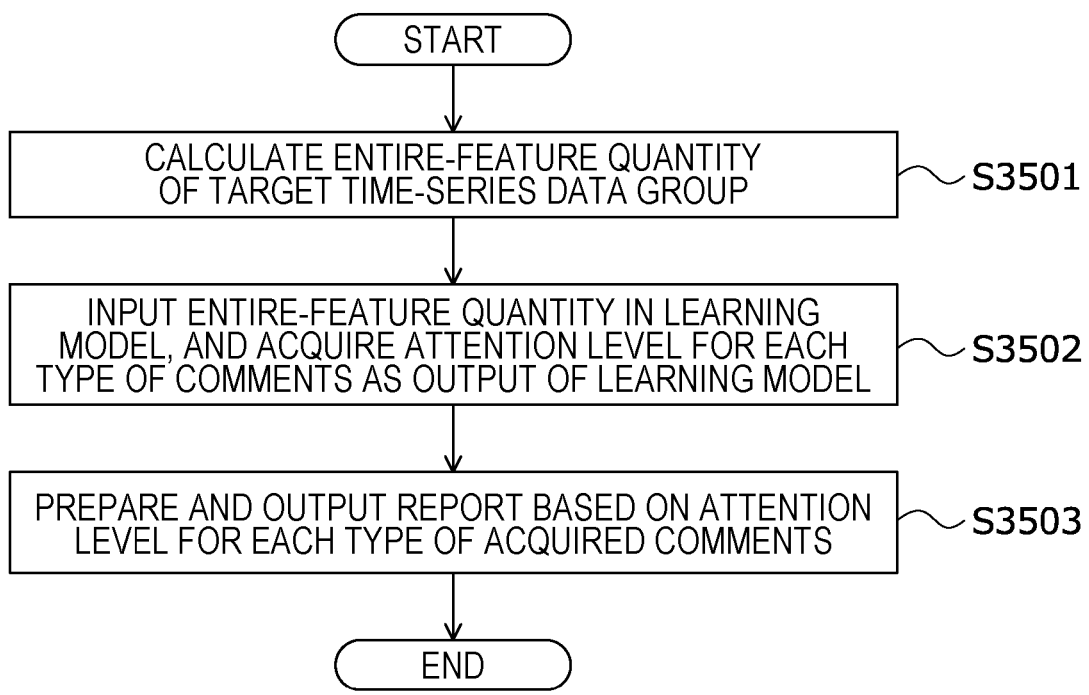
FIG. 35 is a flowchart illustrating an example of a report preparation processing procedure.

FIG. 35 is a flowchart illustrating an example of the report preparation processing procedure. In FIG. 35, first, the information processing device 100 accepts the target time-series data group and calculates the entire-feature quantity of the target time-series data group (step S3501).

Next, the information processing device 100 inputs the entire-feature quantity in the learning model, and acquires the attention level for each type of comment as the output of the learning model (step S3502). The information processing device 100 prepares and outputs a report based on the attention level for each type of acquired comments (step S3503). Thereafter, the information processing device 100 ends the report preparation processing. Accordingly, the information processing device 100 may prepare the report and make it easy to grasp the entire feature of the time-series data group.

As described above, the information processing device 100 may calculate the individual-feature quantity for each piece of time-series data included in the time-series data group. The information processing device 100 may statistically process the calculated individual-feature quantity and calculate the entire-feature quantity of the accepted time-series data group. The information processing device 100 may refer to the learning model representing the relationship between the entire-feature quantity and the contents of the report, and output information on the contents of the report corresponding to the calculated entire-feature quantity. As a result, the information processing device 100 may make it easier to prepare a report representing the entire feature of the time-series data group.

The information processing device 100 may use, for each type of comment, the learning model representing the relationship between the entire-feature quantity and the index value indicating the appearance frequency of the type of comment in the report. The information processing device 100 may output the index value corresponding to the calculated entire-feature quantity for each type of comment. As a result, the information processing device 100 makes it easy to grasp which type of comment is preferable to generate in order to prepare the report representing the entire feature of the time-series data group.

The information processing device 100 may generate and output the comment on at least one of pieces of time-series data included in the accepted time-series data group based on the index value corresponding to the calculated entire-feature quantity for each type of comment. As a result, the information processing device 100 may prepare the report representing the entire feature of the time-series data group, and may reduce the burden of preparing the report.

The information processing device 100 may select at least one of pieces of time-series data for generating the comment among the accepted time-series data group based on the calculated individual-feature quantity or a feature quantity for each piece of time-series data included in the time-series data group where the feature quantity is other than the calculated individual-feature quantity. As a result, the information processing device 100 may select the time-series data from which it is preferable to generate the comment, and makes it possible for the report to accurately represent the entire feature of the time-series data group.

The information processing device 100 may use, as the individual-feature quantity, the feature quantity representing the magnitude of data variation of the time-series data. The information processing device 100 may use, as the entire-feature quantity, the minimum value and the maximum value of the individual-feature quantity. Thus, the information processing device 100 may make it easier to prepare the report describing the comment based on the magnitude of data variation.

The information processing device 100 may use plural pieces of time-series data having the identical attribute as the time-series data group. As a result, the information processing device 100 may use a preferable time-series data group as a target for preparing the report.

The information processing device 100 may use, as the time-series data group, plural pieces of time-series data having common time zones in which each piece of data is acquired or measured. As a result, the information processing device 100 may use the time-series data group on the common time zone, where the time-series data group is preferable as the target for preparing the report.

The report preparation method described in this embodiment may be implemented by executing a prepared program on a computer such as a personal computer or a workstation. The report preparation program described in the present embodiment is recorded on a computer readable recording medium such as a hard disk, a flexible disk, a CD-ROM, an MO, a DVD, or the like, and is executed by being read from the recording medium by a computer. The report preparation program described in the present embodiment may be distributed via a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although at least one of embodiments of the present invention have been described in detail, it should be understood that the various changes, substitutions, and alterations could be made hereto without departing from the spirit and scope of the invention.

What is claimed is:

1. A computer-readable recording medium storing therein a report preparation program that causes at least one of storages and a computer coupled to the at least one of storages to execute a process, the process comprising:
  calculating an individual-feature quantity with respect to an input output per second (IOPS) of the at least one of storages for each piece of time-series data included in a time-series data group with respect to the IOPS;

statistically processing the calculated individual-feature quantity of the time-series data group;

calculating an entire-feature quantity based on the statistically processing;

referring to a learning model generated based on at least one of learning time-series data groups and contents of a report for the at least one of learning time-series data groups, the learning model representing a relationship between an entire-feature quantity and contents of the report; and outputting information on contents of the report corresponding the calculated entire-feature quantity.

2. The computer-readable recording medium storing therein the report preparation program according to claim 1, wherein the report includes a comment on at least one of pieces of time-series data, wherein the learning model represents, for each type of comment, a relationship between an entire-feature quantity and an index value indicating an appearance frequency of the type of comment in a report, and wherein the outputting includes outputting an index value corresponding to a calculated entire-feature quantity for each type of comment.

3. The computer-readable recording medium storing therein the report preparation program according to claim 2, wherein the outputting includes generating and outputting a comment on at least one of pieces of time-series data included in the time-series data group based on an index value corresponding to the calculated entire-feature quantity for each type of comment.

4. The computer-readable recording medium storing therein the report preparation program according to claim 3, wherein the outputting includes selecting at least one of pieces of time-series data for generating a comment out of the time-series data group based on the calculated individual-feature quantity or a feature quantity for each piece of time-series data included in the time-series series data group, the feature quantity being other than the calculated individual-feature quantity.

5. The computer-readable recording medium storing therein the report preparation program according to claim 1, wherein the individual-feature quantity represents a magnitude of a data variation of the time-series data group, and wherein the entire-feature quantity represents a minimum value and a maximum value of the individual-feature quantity.

6. The computer-readable recording medium storing therein the report preparation program according to claim 1, wherein the time-series data group is plural pieces of time-series data having an identical attribute.

7. The computer-readable recording medium storing therein the report preparation program according to claim 6, wherein the attribute is a time zone in which each piece of data included in the time-series data is acquired or measured.

8. A method of preparing a report, the method executed by a computer comprising:

calculating an individual-feature quantity with respect to an input output per second (IOPS) of a storage for each piece of time-series data included in a time-series data group with respect to the IOPS;

statistically processing the calculated individual-feature quantity to calculate an entire-feature quantity of the time-series data group;

referring to a learning model generated based on at least one of learning time-series data groups and contents of a report for the at least one of learning time-series data groups, the learning model representing a relationship between an entire-feature quantity and contents of the report; and outputting information on contents of the report corresponding the calculated entire-feature quantity.

9. A machine learning device comprising:

a memory configured to store time series data and a learning model, the learning model representing a relationship between an entire-feature quantity of at least one learning time-series data group and corresponding learning report; and a processor coupled to the memory and configured to perform acquiring the target time-series data group;

calculating an individual-feature quantity with respect to an input output per second (IOPS) of infrastructure equipment for each piece of time-series data included in the target time-series data group with respect to the IOPS;

statistically processing the calculated individual-feature quantity of the target time-series data group;

calculating an entire-feature quantity based on the statistically processing;

inputting the calculated entire-feature quantity to the learning model to obtain a report for the target time-series data group, the report including at least one comment on target time-series data within the target time-series data group, the at least one comment prepared based on the calculated entire-feature quantity and attention levels assigned to categories of comments within the learning report; and outputting the obtained report.

10. The machine learning device according to claim 9, wherein the corresponding learning report of each of the at least one learning time series data group includes a plurality of comments belonging to different comment categories and an attention levels are assigned for the comment categories within the learning reports, the attention levels being index values for determining importance of comments to be included in the obtained report depending on the input calculated entire-feature quantity.

11. The machine learning device according to claim 10, wherein the learning model represents, for each category of comment, a relationship between an entire-feature quantity and an index value indicating an appearance frequency of the category of comment in the corresponding learning report, and wherein the outputting includes outputting an index value corresponding to the calculated entire-feature quantity for each category of comment.

12. The machine learning device according to claim 11, wherein the outputting includes generating and outputting a comment on at least one of pieces of time-series data included in the time-series data group based on an index value corresponding to the calculated entire-feature quantity for each type of comment.

13. The machine learning device according to claim 12, wherein the outputting includes selecting at least one piece of the target time-series data to be associated with the at least one comment of the obtained report based on the calculated individual-feature quantity or a feature quantity for each piece of the target time-series data, the feature quantity being other than the calculated individual-feature quantity.

14. The machine learning device according to claim 9, wherein the individual-feature quantity represents a magnitude of a data variation of the target time-series data group, and wherein the entire-feature quantity represents a minimum value and a maximum value of the individual-feature quantity.

15. The machine learning device according to claim 9, wherein the at least one learning time-series data group and the target time-series data group include a plurality of pieces of time-series data having an identical attribute.

16. The machine learning device according to claim 15, wherein the attribute is a time zone in which each piece of data included in the time-series data is acquired or measured.

* * * * *